US012706955B2

(12) United States Patent
Lindskog et al.

(10) Patent No.: US 12,706,955 B2
(45) Date of Patent: Aug. 11, 2026

(54) POLICY ENFORCEMENT AND CONTINUOUS POLICY MONITORING ON RECONFIGURABLE HARDWARE DEVICE

(71) Applicant: TELEFONAKTIEBOLAGET LM ERICSSON (PUBL), Stockholm (SE)

(72) Inventors: Niklas Lindskog, Lund (SE); Håkan Englund, Lund (SE); Henrik Normann, Malmö (SE); Lina Pålsson, Genarp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 145 days.

(21) Appl. No.: 18/690,605

(22) PCT Filed: Sep. 8, 2021

(86) PCT No.: PCT/IB2021/058169

§ 371 (c)(1),
(2) Date: Mar. 8, 2024

(87) PCT Pub. No.: WO2023/037140

PCT Pub. Date: Mar. 16, 2023

(65) Prior Publication Data

US 2025/0016200 A1 Jan. 9, 2025

(51) Int. Cl.
*H04L 9/40* (2022.01)
*H04L 9/08* (2006.01)

(52) U.S. Cl.
CPC ............ *H04L 63/20* (2013.01); *H04L 9/0825* (2013.01)

(58) Field of Classification Search
CPC .............................. H04L 63/20; H04L 9/0825
(Continued)

(56) References Cited

U.S. PATENT DOCUMENTS 10,248,410 B2 4/2019 Lin et al.
10,528,765 B2 1/2020 Smith et al.
(Continued)

FOREIGN PATENT DOCUMENTS

WO 2020163760 A2 8/2020
WO 2020231952 A1 11/2020

OTHER PUBLICATIONS

"Trusted Platform Module (TPM) 2.0: A Brief Introduction", Trusted Computing Group, Jun. 2019.
(Continued)

*Primary Examiner* — Anthony D Brown

(74) *Attorney, Agent, or Firm* — Murphy, Bilak & Homiller, PLLC

(57) ABSTRACT

Systems and method for enforcing a policy of a configuration and continuously monitoring the policy on a Reconfigurable Hardware Device (RHD) are provided. In some embodiments, the RHD comprises a loader component, a validator component, and at least one region of programmable logic. The loader component is configured to receive a configuration from an external entity. The validator component is configured to obtain a policy, perform an evaluation of the policy based on information about the RHD, and perform one or more actions based on a result of the evaluation of the policy. In this way, some embodiments herein can restrict what properties the RHD must comply with before the configuration is deployed and possibly sensitive data is exposed. Further, by adopting some embodiments, the RHD can be used to quickly change behavior of a vehicle when encountering a new location or environmental condition.

20 Claims, 17 Drawing Sheets

(58) Field of Classification Search
USPC .............................................................. 726/1
See application file for complete search history.

(56) References Cited

U.S. PATENT DOCUMENTS

| | | | | |
|---|---|---|---|---|
| 10,657,830 | B2 | 5/2020 | Gordon et al. | |
| 10,678,266 | B2 | 6/2020 | Erickson et al. | |
| 2012/0284502 | A1* | 11/2012 | Zievers | H04L 49/115 713/100 |
| 2016/0202999 | A1* | 7/2016 | Van Den Heuvel | G06F 9/5044 713/100 |
| 2016/0260331 | A1 | 9/2016 | Salentiny et al. | |
| 2018/0082083 | A1* | 3/2018 | Smith | G06F 21/575 |
| 2018/0285139 | A1 | 10/2018 | Shapira et al. | |
| 2018/0314846 | A1 | 11/2018 | Schultz et al. | |
| 2018/0357086 | A1 | 12/2018 | Kinsella et al. | |
| 2019/0042320 | A1 | 2/2019 | Prince et al. | |
| 2019/0049912 | A1 | 2/2019 | Poornachandran et al. | |
| 2019/0108064 | A1 | 4/2019 | Stafford et al. | |
| 2019/0228666 | A1 | 7/2019 | Lassini | |
| 2021/0117246 | A1* | 4/2021 | Lal | G06F 9/3814 |
| 2022/0004397 | A1* | 1/2022 | Ringlein | G06F 9/44505 |
| 2022/0382918 | A1* | 12/2022 | Ling | H04L 9/3239 |

OTHER PUBLICATIONS

3GPP TS 23.273 V17.0.0, "3rd Generation Partnership Project; Technical Specification Group Services and System Aspects; 5G System (5GS) Location Services (LCS); Stage 2 (Release 17)", 3GPP TS 23.273 V17.0.0, Mar. 2021.

3GPP TS 23.501 V17.0.0, "3rd Generation Partnership Project; Technical Specification Group Services and System Aspects; System architecture for the 5G System (5GS); Stage 2 (Release 17)", 3GPP TS 23.501 V17.0.0, Mar. 2021.

3GPP TS 23.287 V16.5.0, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.5.0, Dec. 2020.

3GPP TR 33.848, V0.8.0, "3rd Generation Partnership Project; Technical Specification Group Services and System Aspects; Security Aspects; Study on Security Impacts of Virtualisation (Release 17)", 3GPP TR 33.848, V0.8.0, May 2021.

3GPP TR 23.754 V17.1.0, "3rd Generation Partnership Project; Technical Specification Group Services and System Aspects; Study on supporting Unmanned Aerial Systems (UAS) connectivity, dentification and tracking (Release 17)", 3GPP TR 23.754 V17.1.0, Mar. 2021.

ETSI, "Network Functions Virtualisation (NFV); Use Cases", ETSI GR NFV 001 V1.2.1, May 2017.

Paladi, et al., "Trusted Geolocation-Aware Data Placement in Infrastructure Clouds", ResearchGate, Conference Paper, Sep. 2014.

Xilink, "Security Monitor IP—Industry-Leading Programmable Logic Device Security Protecting IP and Mission Critical Data", 2019.

Yeluri et al., "Building the Infrastructure for Cloud Security—A Solutions View", Apress Open, 2014.

"Export of cryptography from the United States", <https://en.wikipedia.org/wiki/Export_of_cryptography_from_the_United_States.>, accessed Jun. 28, 2021, Jan. 16, 2021, 1-5.

European Commission, "Adequacy decisions—How the EU determines if a non-EU country has an adequate level of data protection", <https://commission.europa.eu/law/law-topic/data-protection/international-dimension-data-protection/adequacy-decisions_en>, accessed Jul. 14, 2021, 1-4.

Intel, "Intel FPGA device plugin for Kubernetes", <https://intel.github.io/intel-device-plugins-for-kubernetes/cmd/fpga_plugin/README.html>, accessed Jul. 14, 2021, 1 page.

Sharetechnote, "5G/NR—MIB / SIB", <sharetechnote.com/html/5G/5G_Mib_Sib.html>, accessed Jun. 28, 2021, 1-14.

* cited by examiner

POLICY ENFORCEMENT AND CONTINUOUS POLICY MONITORING ON RECONFIGURABLE HARDWARE DEVICE

PRIORITY CLAIM

This application is a national stage application of International Patent Application No. PCT/IB2021/058169, filed Sep. 8, 2021, the disclosure disclosures of which is hereby incorporated in its entirety by reference.

TECHNICAL FIELD

The present disclosure relates to enforcing a policy of a configuration and continuously monitoring the policy on a reconfigurable hardware device.

BACKGROUND

Field-Programmable Gate Array (FPGA)

An FPGA is an integrated circuit designed to be programmed after manufacturing, hence the term is 'field-programmable.' The FPGA contains Configurable Logic Blocks (CLBs), which can be used and connected differently to determine the behavior of the FPGA. The entirety of CLBs on an FPGA is referred to as Programmable Logic (PL). In addition to PL, an FPGA may have input/output ports (I/O), on-chip and off-chip Radio Access Memory (RAM), and/or other peripherals. Several FPGAs have also been delivered with their own Processing Subsystems (PSs), which are sometimes referred to as Hard Processors (HP). These devices are generally referred to as System-on-Chip (SoC) FPGAS.

At startup, the FPGA is booted via a configuration, sometimes known as a Programmable Device Image (PDI) stored either on a memory card or provided through a Joint Test Action Group (JTAG) interface or Serial Peripheral Interface (SPI). The configuration may comprise several components, such as (a) bootloader software that is responsible for loading and configuring other components; (b) platform management unit software that is responsible for monitoring resources, controlling reset, and power-up; (c) one or several software applications that are running in the PS; (d) configuration for Application-Specific Integrated Circuits (ASICs), e.g., specialized hardware accelerators; and (e) one or several bitstreams that configure the PL. A bitstream may comprise one or several Intellectual Property (IP) blocks that deliver certain functionality to the bitstream. Examples of such IP blocks may be a cryptographic module or a proprietary protocol decoder. To ensure only a trusted configuration can be loaded, each part of the PDI can be individually confidential or integrity protected. The current secure boot procedure for an FPGA requires root encryption or root authentication keys to be programmed on the FPGA before uploading a configuration. A bitstream may comprise one or several Intellectual Property (IP) blocks that deliver certain functionality to the bitstream. Examples of such IP blocks may be a cryptographic module or a proprietary protocol decoder.

The current secure boot procedure for an FPGA requires root encryption or root authentication keys to be programmed on the FPGA before uploading a configuration. Partial Reconfiguration (PR) allows an FPGA developer to define distinct physical areas on the FPGA, which can be reconfigured with individual (partial) bitstreams. This reconfiguration may be done during runtime without impacting the rest of the FPGA. A partial bitstream contains only hardware design for a pre-determined area. Currently, the development flow requires all partial bitstreams to be compiled together with the full bitstream.

In the present disclosure, FPGAS, SoCs, and Adaptable Computing Acceleration Platforms (ACAPs) (e.g., an SoC FPGA containing additional logic designed for Artificial Intelligence (AI) computations) are generally referred to as a reconfigurable hardware device (RHD). Throughout the present disclosure, the FPGA/SoC/ACAP and the RHD may be used interchangeably. Furthermore, the term "soft" is used to indicate something implemented in PL, while "hard" is used to indicate a physical implementation. For example, a soft Central Processing Unit (CPU) is a CPU instance built from PL, and a hard CPU is a physical CPU present on the device.

FPGA-as-a-Service (FaaS)

For several decades, the FPGA has been something of a niche device, not generally available outside academia and industries such as telecommunications, defense, and industrial automation. However, as computationally intensive algorithms present in, e.g., machine learning, have gained tremendous popularity during the 2010s, the need for specialized acceleration has increased massively.

The heterogeneous and reprogrammable nature of FPGAs fits these needs and has opened up new use cases for these devices. Driven by this new demand for FPGA acceleration, several cloud providers now offer an FPGA-as-a-Service (FaaS), which is a concept where the FPGA is offered as pay-per-use and gives the users almost the same capabilities as if they would have owned the device.

In a FaaS setting, the FPGA may be described as two separate planes, a programmable plane and a control plane. First, the programmable plane (also known as a "role") is a part of the FPGA available to the end-user for deploying bitstreams and applications. If the programmable plane is divided into several sections being used for different tasks or by different users, the programmable plane is said to be divided into several "roles" or "role regions". Second, the FPGA also contains a control plane, or "shell", which is controlled by the hardware owner (HwO). The control plane contains, for example, the bitstream programmer and security peripherals.

Safeguarding Processing of Data in a Virtualized Environment

Traditionally, network functions representing a cellular network have been represented by physical devices. For example, a dedicated hardware has been present for a certain network function or set of network functions. Over time, this has changed as new use cases increase the need for more flexible networks and there is a high need to drastically reduce the cost. In this regard, the concept of virtualization is one of the primary drivers for Fifth Generation (5G). The concept of virtualization moves a network function from dedicated hardware to Commercial Off The Shelf (COTS) hardware; thus virtualization may provide flexibility for both scaling and hosting of the functionality.

Clause 8 from European Telecommunications Standards Institute (ETSI) GR NFV 001 v.1.2.1 (2017-15) ("Network Functions Virtualisation (NFV); Use Cases") explains the transformation of use cases that are enabled by virtualization. In the past, companies used to buy the dedicated hardware and host the machines themselves. Nowadays, companies can buy functionalities, such as cellular network functions, packed as so-called "containers." A container is a software package that can run on ordinary COTS hardware. The concept of Container-as-a-Service (CaaS) refers to a company providing runtime and resources for another company to deploy their containers in a cloud environment. The company hosting containers is known as a Cloud Service Provider (CSP), and the company running containers on the CSPs runtimes is typically referred to as a tenant or a client. In an 5G NFV context, the tenant is typically a mobile network operator. The company providing the container to a tenant is typically referred to as a vendor. In some 5G deployments, the Mobile Network Operator (MNO) owns its own data centers. In other words, the MNO also acts as the CSP.

An alternative to the CaaS is that the tenant is given access to a whole guest operating system (running as a virtual machine) using a hypervisor. This is sometimes referred to as Infrastructure-as-a-Service (IaaS). Nevertheless, the tenant has no control or ownership of the underlying hardware and infrastructure, leaving the tenant in a similar position as of the CaaS deployment. The tenant must have to trust in the CSP. In this context, the FPGA-as-a-Service is a hardware-specific IaaS instance.

Third Generation Partnership Project (3GPP) TR 33.848 v0.8.0 (2021-05) ("Study on Security Impacts of Virtualisation (Release 17)") studies various security aspects related to the introduction of virtualization, in particular, "Key Issue 5: Data Location and Lifecycle" that discusses fundamental issues related to data handling in the cloud. In the past, relying on physical network functions, it was easier to tell, with high certainty, where sensitive data such as subscriber data was located. However, the introduction and deployment in a cloud environment complicate deciding where data is located and processed since the tenant is not aware of the underlying hardware in a CaaS or an IaaS scenario. A CSP may have numerous data centers within several legal jurisdictions. Using virtualization, network functions are typically represented by containers, one host can have multiple containers running sharing the hardware resources and the containers can be executed on varying hosts. The containers are started and stopped dynamically depending on for example workload, the CSP needs to associate hardware resources rapidly to any container starting. Where this hardware is physically located is unknown to the tenant. The key issue specifically mentions the need for location constraints related to lawful intercept functionality, content licensed for a limited area and on a more general term, data relevant for General Data Protection Regulation (GDPR). In a document titled "Adequacy decisions—How the EU determines if a non-EU country has an adequate level of data protection" from the European Commission, data of European citizens should flow and be processed within the European Union without issues. The same applies to certain countries deemed as "adequate." Therefore, it is of interest to the tenant to know whether data is contained within such restrictions.

Trusted Platform Module (TPM) has been used to create trust in virtualized cloud environments providing services, as for instance, IaaS. Implementations use TPM as a root to provide geolocation of the machine, which is described in, for instance, (a) Trusted Computing Group, TPM 2.0 Library and (b) a book written by Raghu Yeluri et al. (Building the Infrastructure for Cloud Security, Apress, 2014). The technology can also be used for other assets or properties, except for geolocation. Examples mentioned in Raghu Yeluri's book are Service Level Agreement (SLA)-based zoning of data center assets, Sarbanes-Oxley audits, and workload segregation.

SUMMARY

Embodiments of enforcing a policy and continuously monitoring the policy on a Reconfigurable Hardware Device (RHD) and related methods are disclosed herein.

In some embodiments, the RHD comprises a loader component, a validator component, and at least one region of programmable logic. The loader component is configured to receive a configuration from an external entity. The validator component is configured to obtain a policy, perform an evaluation of the policy based on information about the RHD, and perform one or more actions based on a result of the evaluation of the policy. In this way, some embodiments herein can restrict what properties the RHD must comply with before the configuration is deployed and possibly sensitive data is exposed. Further, by adopting some embodiments, the RHD can be used to quickly change behavior of a vehicle when encountering a new location or environmental condition.

In one embodiment, at least one bitstream for the at least one region of programmable logic is comprised in the configuration.

In one embodiment, the validator component is further configured to obtain the policy from the loader component.

In one embodiment, the policy is comprised in the configuration.

In one embodiment, the information about the RHD comprises a set of device properties.

In one embodiment, in order to perform the evaluation of the policy, the validator component is further configured to determine whether the set of device properties satisfies one or more requirements defined by the policy.

In one embodiment, responsive to the result of the evaluation of the policy indicating that the evaluation is successful, the one or more actions performed by the validator component comprise allowing at least one bitstream comprised in the configuration to be loaded into the at least one region of programmable logic.

In one embodiment, responsive to the result of the evaluation of the policy indicating that the evaluation is successful, the one or more actions performed by the validator component further comprise sending a proof-of-compliance to an external entity.

In one embodiment, responsive to the result of the evaluation of the policy indicating that the evaluation is unsuccessful, the one or more actions performed by the validator component comprise: (i) disallowing loading of at least one bitstream comprised in the configuration into at least one region of programmable logic; (ii) altering the configuration by loading an altered version of the bitstream into at least one region of programmable logic; (iii) loading at least one bitstream comprised in the configuration into at least one region of programmable logic; (iv) enabling or disabling at least one region of programmable logic; or (v) any combination of (i-iv).

In one embodiment, in order to perform the evaluation of the policy, the validator component is further configured to determine whether the set of device properties is cryptographically signed with a private key that is aligned with a public key in the RHD; and the result of the evaluation of the policy is successful if the set of device properties is cryptographically signed with the private key that is aligned with the public key in the RHD and the set of device properties satisfies the one or more requirements defined by the policy and otherwise the result of the evaluation of the policy is unsuccessful.

In one embodiment, the loader component is further configured to receive an initial policy before receiving the configuration; and the validator component is further configured to: determine whether the set of device properties satisfies a requirement defined by the initial policy; responsive to determining that the set of device properties satisfies the requirement defined by the initial policy, send an indication that the initial policy is satisfied to an external entity.

In one embodiment, the validator component is further configured to: receive a set of measurements from a set of sensors associated to the RHD; and perform the evaluation of the policy based on the set of measurements.

In one embodiment, responsive to the evaluation result indicating that the evaluation is not successful, the one or more actions performed by the validator component comprises: (i) disallowing loading of at least one bitstream comprised in the configuration into at least one region of programmable logic; (ii) altering the configuration by loading an altered version of the bitstream into at least one region of programmable logic; (iii) loading at least one bitstream comprised in the configuration into at least one region of programmable logic; (iv) enabling or disabling at least one region of programmable logic; or (v) any combination of (i-iv).

In one embodiment, responsive to the evaluation result indicating that the evaluation is successful, the validator component is configured to receive another set of measurements from the set of sensors.

In one embodiment, the RHD is included in a moving object.

Corresponding embodiments of methods performed by the RHD are also disclosed.

In one embodiment, a method performed by the RHD comprises receiving a configuration; obtaining a policy; performing an evaluation of the policy based on information about the RHD; and performing one or more actions based on a result of the evaluation of the policy.

In one embodiment, at least one bitstream for at least one region of programmable logic of the method is comprised in the configuration.

In one embodiment, obtaining the policy in the method comprises obtaining the policy from a loader component.

In one embodiment, the policy in the method is comprised in the configuration.

In one embodiment, the information about the RHD in the method comprises a set of device properties.

In one embodiment, performing the evaluation of the policy in the method further comprises determining whether the set of device properties satisfies one or more requirements defined by the policy.

In one embodiment, responsive to the result of the evaluation of the policy indicating that the evaluation is successful, the one or more actions performed by the validator component in the method comprise allowing at least one bitstream comprised in the configuration to be loaded into the at least one region of programmable logic.

In one embodiment, the one or more actions in the method, which are responsive to the result of the evaluation of the policy indicating that the evaluation is successful further comprise sending) a proof-of-compliance to an external entity.

In one embodiment, responsive to the result of the evaluation of the policy indicating that the evaluation is unsuccessful, the one or more actions performed by the validator component in the method comprise: (i) disallowing loading of at least one bitstream comprised in the configuration into at least one region of programmable logic; (ii) altering the configuration by loading an altered version of the bitstream into at least one region of programmable logic; (iii) loading at least one bitstream comprised in the configuration into at least one region of programmable logic; (iv) enabling or disabling at least one region of programmable logic; or (v) any combination of (i-iv).

In one embodiment, performing the evaluation of the policy in the method further comprises determining whether the set of device properties is cryptographically signed with a private key that is aligned with a public key in the RHD; and the result of the evaluation of the policy is successful if the set of device properties is cryptographically signed with the private key that is aligned with the public key in the RHD and the set of device properties satisfies the one or more requirements defined by the policy and otherwise the result of the evaluation of the policy is unsuccessful.

In one embodiment, the method further comprises receiving an initial policy before receiving the configuration; determining whether the set of device properties satisfies a requirement defined by the initial policy; and responsive to determining that the set of device properties satisfies the requirement defined by the initial policy, sending an indication that the initial policy is satisfied to an external entity.

In one embodiment, a method performed by an operator of the RHD comprises: determining the information about the RHD; writing the information about the RHD to a memory of the RHD; hashing the information about the RHD with an identity of the RHD; and applying a signature to the information about the RHD.

In one embodiment, the method performed by the operator of the RHD comprises: receiving a set of measurements from a set of sensors associated to the RHD; and performing the evaluation of the policy comprises performing the evaluation of the policy based on the set of measurements.

In one embodiment, in the method performed by the operator of the RHD, responsive to the evaluation result indicating that the evaluation is not successful, the one or more actions performed by the validator component comprises: (i) disallowing loading of at least one bitstream comprised in the configuration into at least one region of programmable logic; (ii) altering the configuration by loading an altered version of the bitstream into at least one region of programmable logic; (iii) loading at least one bitstream comprised in the configuration into at least one region of programmable logic; (iv) enabling or disabling at least one region of programmable logic; or (v) any combination of (i-iv).

In one embodiment, in the method, responsive to the evaluation result indicating that the evaluation is successful, the validator component is configured to receive another set of measurements from the set of sensors.

In one embodiment, a deployment method performed by the operator of the RHD comprises uploading the configuration into the RHD; inspecting a signature of the configuration; loading the policy by using the validator component; and saving additional bitstreams or software in a memory of the RHD.

BRIEF DESCRIPTION OF THE DRAWINGS

The accompanying drawing figures incorporated in and forming a part of this specification illustrate several aspects of the disclosure, and together with the description serve to explain the principles of the disclosure. Optional features are represented by dashed boxes.

DETAILED DESCRIPTION

Figure 1:
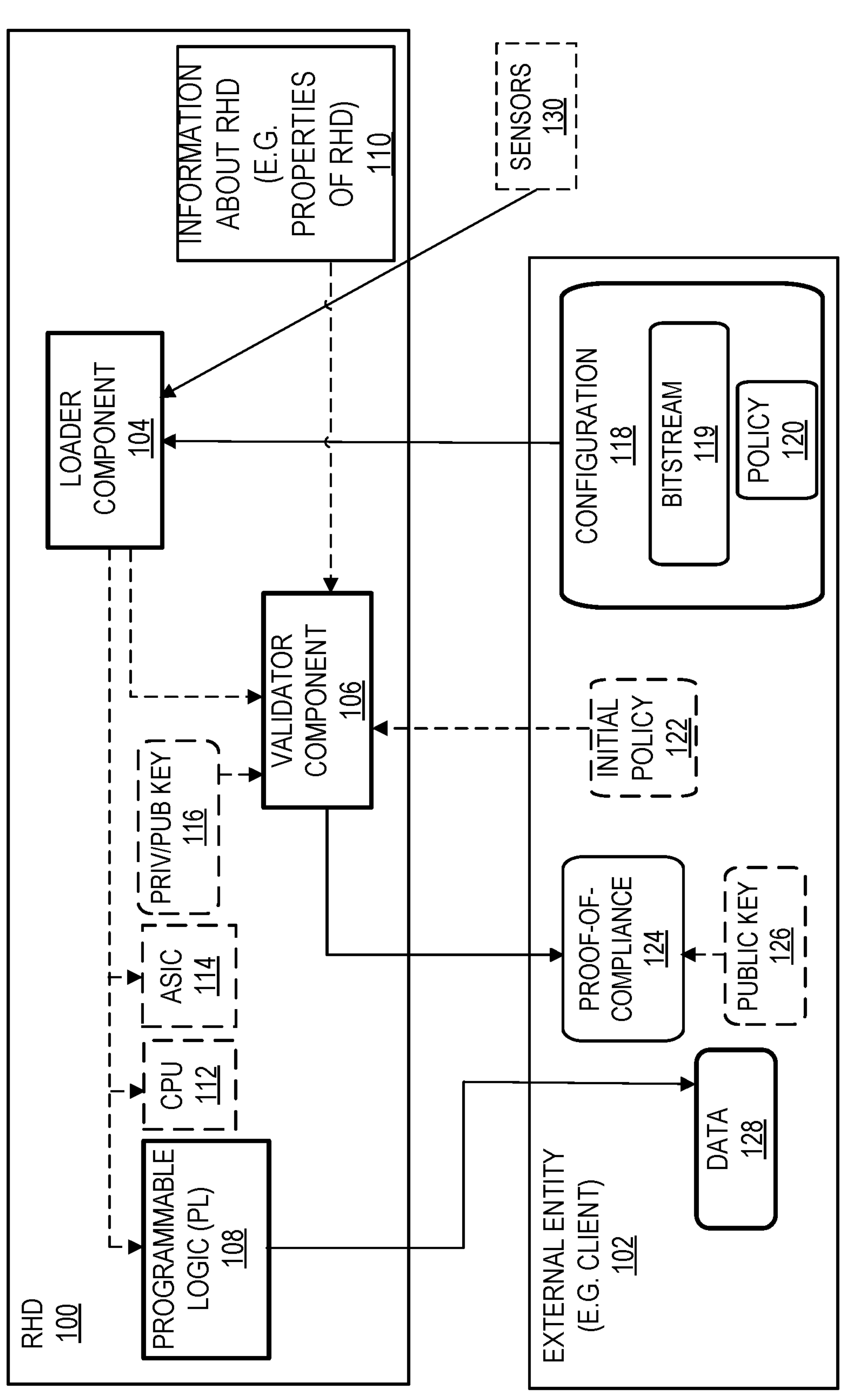
FIG. 1 illustrates components in a Reconfigurable Hardware Device (RHD) in accordance with some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

I. Policy Enforcement on Remote Reconfigurable Hardware

In current Field Programmable Gate Array (FPGA)-as-a-Service (FaaS) deployments, it is not possible for the client to determine where a Reconfigurable Hardware Device (RHD) is located, what physical protection is in place, etc., before the bitstream is deployed and data is exposed. It is difficult for the client to determine or limit its configuration to only be uploaded to an RHD that has certain properties, e.g., geographically located within the European Union (EU).

Certain Intellectual Property (IP) blocks have different licensing agreements in different jurisdictions and may therefore only be deployed in certain geographical areas. A notable example of such IP blocks is cryptographic IP blocks that may be susceptible to export restrictions. Few patents exist which cover the area of policy enforcement on remote RHDs. U.S. Pat. No. 10,528,765 B2 to Smith et al. ("Technologies for secure boot provisioning and management of field-programmable gate array images") covers some of this functionality but does not allow a client/tenant using the RHD to decide the policy. In this patent, a policy present on the RHD, which may include the geolocation of the RHD, decides if a certain bitstream may be deployed. In this patent, the policy is connected to a specific RHD, in contrast to a user, IP vendor, bitstream, or IP block, and there is no mention of altering functionality as a policy-based action.

The solutions with Trusted Platform Module (TPM)-based property settings used to enforce policies, as mentioned in Background section entitled "Safeguarding processing of data in a virtualized environment," are used to enforce policies for the instance accessing the RHD. The solutions could, at least theoretically, be leveraged to enforce the policy also for the RHD itself. It can be assumed that the RHD is located in proximity to the accessing instance. However, such solution is very limited. It can only enforce a binary go/no-go decision and not alternate on behavior at the RHD depending on the result of the policy evaluation. Another limitation is that the policy evaluation in such a solution will be situated on the instance accessing the RHD and not the RHD itself. This means that the evaluation is not done by the RHD itself but rather by another instance that is assumed to have the same properties as the RHD. In the case of geolocation, this may be true, but in other cases, such a connection cannot be assumed, for example, for a property defining security classes that can typically be set individually per an instance or a device.

In the present disclosure, the owner of the configuration, i.e., the client/tenant, uses a remote RHD, e.g., as a part of the Infrastructure-as-a-Service (IaaS) offering. The RHD has one or several properties of the RHD, such as geolocation, physical protection, company, etc., stored on the RHD. Optionally, these properties are signed by a trusted party.

A configuration for the RHD, which may contain a bitstream or a software application, may also include a policy. The policy may specify requirements on the properties of the RHD. The configuration of an RHD may also comprise one or several IP blocks, where each of the IP blocks can have its own restrictions on the properties of the RHD, specified in the policy. When the RHD tries to load the configuration, the policy is checked against the stored properties by a validator component. In some embodiments, the validator component is a part of the RHD. In other embodiments, the validator component is supplied by an external entity, e.g. a client. If the RHD is compliant with the policy, the configuration is loaded and data may be sent to the RHD. Otherwise, the configuration is rejected. In another embodiment, the functionality of the configuration may be altered, or certain functions may be disabled if the RHD is not compliant with the policy.

The present disclosure is placed in a scenario where an external entity, such as a client or a tenant, wants to upload a configuration to a remotely located RHD. The external entity wants to ensure that the RHD, which receives the configuration and subsequently the data, fulfills certain requirements stated in a policy provided by the external entity. The policy is either integrated into a part of the configuration, as a separate part of the configuration or, as an independent package, sent prior to the configuration.

As stated earlier, the policy defines certain requirements that may include e.g., geolocation and physical protection. The RHD must be able to provide trustworthy information whether the policy is fulfilled or not. The information and the policy are validated using the validator component that is either a part of the hardware, i.e. a component run by the hardware owner or a software component provided in the configuration. The requirements of some policies, like geolocation, may in some cases be considered as valid on the virtual instance (like a container or Virtual Machine (VM)) accessing the FPGA as well as on all other virtual instances residing on the same hardware instance. Due to performance confinements, it may be assumed that the FPGA is located in proximity to the instance using it.

If the requirements of the policy are satisfied, the validator component may deploy the configuration. If the requirements are not satisfied, the configuration may be denied being deployed. In one embodiment, certain functionalities within the configuration may be replaced or deactivated. The client is able to remotely attest the device by receiving a policy fulfillment statement from the device informing if and how the configuration has been deployed prior to exposing any data.

The owner of the configuration, the IPs, or the data may restrict what properties the RHD must comply with before the configuration is deployed and before possibly sensitive data is exposed. An example of the benefit of the present disclosure is to restrict the geographical location of the RHD to comply with legal restrictions of the configuration and to ensure data does not unknowingly cross jurisdictions. The present disclosure provides the possibilities to: (a) restrict an RHD configuration to only be deployed on an RHD matching a policy decided by the owner of the configuration or IP-blocks within the configuration; (b) alter the behavior or functionality of a deployed configuration depending on the policy decided by the configuration or IP-blocks within the configuration; and (c) provide verifiable device properties into the policy evaluation and securely return the status to the client.

Another example of the benefit of the present disclosure is to guarantee that the tenant's data is processed in a certain location or take other policies into account. Also, the present disclosure described fits well into the existing IaaS cloud environment providing FPGA functionality, also known as FaaS. The tenant will be able to set the policy in adjunction to the bitstream to be programmed as described in the present disclosure. Furthermore, it is already technically possible to use an FPGA in today's CaaS or alternative deployments where the Cloud Service Provider (CSP) has the same or higher level of control as in CaaS. An example of how to realize the contact between the container and the RHD located in the lower layers would be to rely upon a plugin, e.g. developed by Intel, that provides such connection. See GitHub web page ("Intel FPGA device plugin for Kubernetes"). The present disclosure also fits well into such cloud offerings as long as the bitstream can be modified by the tenant. Moreover, cryptographic solutions may be added to create assurance that the FPGA is acting as desired including the aspect of respecting the policy provided by the tenant. Such cryptographic assurance may also be used when providing FPGA functionality using a CaaS like solution as well as in an IaaS like solution.

FIG. 1 illustrates a system including an RHD 100 and an external entity 102 in accordance with some embodiments of the present disclosure. The RHD 100 may be embodied, e.g., by a standalone FPGA PCI Express acceleration card, a multi-die chip incorporating an FPGA, a System-on-Chip (SoC) with an embedded FPGA, or an Adaptable Computing Acceleration Platforms (ACAP).

A loader component 104 may be included in the RHD 100. The loader component 104 may be a software component but also may be implemented with hardware parts (e.g., gates).

A validator component 106 may be included in the RHD 100. The validator component 106 may be implemented in hardware (hard IP) or as a software module on a preferably dedicated Central Processing Unit (CPU). In some embodiments, the validator component 106 is part of the hardware of the RHD 100, which is provided by the Hardware Owner (HwO).

Programmable Logic (PL) 108 may be included in the RHD 100. The PL 108 includes the entirety of Configurable Logic Blocks (CLBs), which may be used and connected differently to determine the behavior of the RHD 100.

A (non-volatile) memory 110 may be included in the RHD 100. The memory 110 may store information about the RHD 100. Examples of the information about the RHD 100 are (i) properties of the RHD 100 and (ii) measurements related to the RHD 100. The properties of the RHD 100 may include (a) geographic location of the RHD (geohash, geocode, GPS coordinate, and etc.); (b) available hardware capabilities (a number of CPUs, Graphics Processing Units (GPUs), hard accelerators such as AI processors, a number of CLBs in PL etc.); (c) HwO identity (e.g., company); (d) hardware identity (a unique identifier for a specific device); and (e) physical protection of the RHD (tamper-proof casing etc.). Examples of the measurements related to the RHD 100 may include positioning, (positioning satellites, mobile network base stations, Wi-Fi networks etc.), environmental conditions (temperature, wind, rainfall etc.), proximity to other objects, and remaining battery power.

The information about the RHD 100 (e.g., the properties of the RHD 100) may be evaluated by the validator component 106. For example, the information about the RHD 100 (e.g., the properties of the RHD 100) may be associated with a trusted signature and the validator component 106 may validate the trusted signature on the information about the RHD 100 (e.g., the properties of the RHD 100).

A CPU 112 or a dedicated hardware circuit or an Application-Specific Integrated Circuit (ASIC) 114 may be included in the RHD 100. Public keys or private keys 116 may be stored in the RHD 100.

The configuration 118, which may be provided by the external entity 102, may be received by the RHD 100 (e.g., the loader component 104). The configuration 118 may contain several bitstreams 119 to be selected and loaded by the RHD 100 (e.g., the loader component 104). The configuration 118 may contain modules intended to set up or run on certain components of the RHD 100. Examples of such modules are bitstreams to run on the PL 108, software applications to run on the CPU 112, and conditions configured for the ASIC 114. The modules of the configurations 118 may be loaded by the loader component 104 of the RHD 100. In some embodiments, the configuration 118 may contain the validator component 106.

The policy 120 may be included in the configuration 118. The policy 120 is associated with the configuration 118 and contains restrictions on what properties the RHD should have. These restrictions are collected in the policy 120, e.g.

in a JavaScript Object Notation (JSON) or extensible Markup Language (XML) format. The policy 120 may include fixed properties, such as: (a) geographic location of the RHD (geohash, geocode, GPS coordinate); (b) hardware capabilities (CPUs, GPUs, hard accelerators, such as AI processors, a number of CLBs in PL etc.); (c) HwO identity (e.g., company); (d) hardware identity (a unique identifier for a specific device); and (e) physical protection of the RHD (tamper-proof casing, etc.). In some embodiments, the policy 120 may also include non-permanent properties as: multi-tenancy allowed or disallowed; PL setup (a certain shell must be in place); and properties related to the end-user. In particular, the non-permanent properties included in the policy 120 are useful in embodiments where the end consumers of the accelerated data are not the same entities as the data owners or clients. The validator component 106 checks the compliance of the RHD 100 by validating the properties of the RHD 100 against the policy 120.

An initial policy 122 may be received by the RHD 100 before receiving the configuration 118 (and the accompanying policy 120) from the external entity 102.

A proof-of-compliance 124 may be sent by the RHD 100 to the external entity 102. The proof-of-compliance 124 may indicate that the information about the RHD 100 (e.g., the properties of the RHD 100) is compliant with requirements stated in the policy 120. The external entity 102 may use a stored public key 126 to determine that the proof-of-compliance 124 is satisfactory. After determining that the proof-of-compliance 124 is satisfactory, the external entity 102 may exchange data 128 with the RHD 100.

I.A. Embodiment 1

In Embodiment 1 of the present disclosure, the HwO (e.g., a Cloud Service Provider (CSP)) and the external entity (e.g., client) 102 are involved. Also, Embodiment 1 may comprise two distinct phases: a deployment phase and a usage phase.

Figure 2:
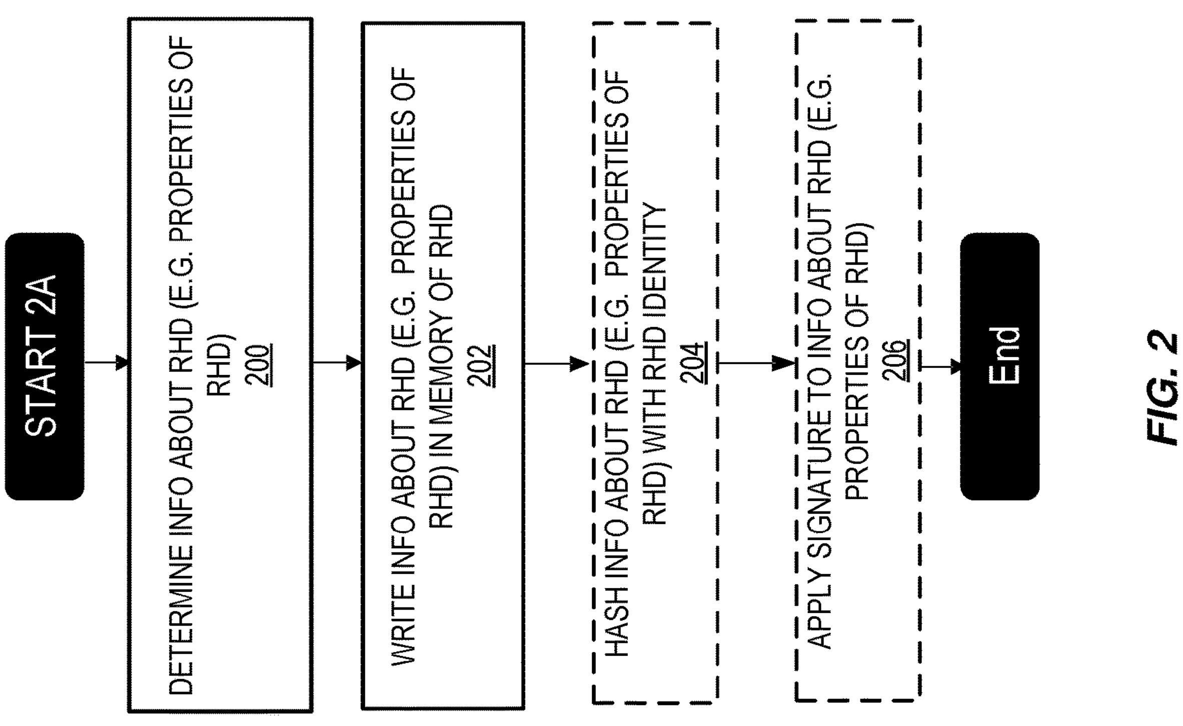
FIG. 2 is a flow chart of a deployment phase in an RHD in accordance with some embodiments of the present disclosure.

FIG. 2 is a flow chart of a deployment phase in accordance with some embodiments of the present disclosure. In the deployment phase of Embodiment 1, the HwO deploys the RHD 100 as a new RHD in a certain location, e.g., a server hall. When the RHD 100 is deployed, the information about the RHD 100 (e.g., the properties of the RHD 100) are written to the memory 110 of the RHD 100. The information about the RHD 100 (e.g., the properties of the RHD 100) may be occasionally checked by the RHD 100, the HwO, or the external entity 102 to ensure that they are correct.

In step 200, the HwO of the RHD 100 obtains at least some of the information about the RHD 100 (e.g., the properties of the RHD 100). The HwO may do so by determining information about the RHD 100. For example, the information about the RHD 100 (e.g., the properties of the RHD 100) may include (a) a geographic location of the RHD 100 (also referred to herein as a "geotag"), e.g. through a GPS readout from an associated GPS receiver, (b) inspection of physical protection, or (c) capabilities of those properties.

In step 202, the HwO writes (at least some of) the information about the RHD 100 (e.g., the properties of the RHD 100) obtained in step 200 to the memory 110 of the RHD 100. In (optional) step 204, to increase the level of trust, the information about the RHD 100 (e.g., the properties of the RHD 100) written to the RHD 100 may be connected to a device identity of the RHD 100, e.g., by hashing the properties together with the device identity. In (optional) step 206, the HwO applies signatures to the information about the RHD 100 (e.g., the properties of the RHD 100). The device identity of the RHD 100 may also contain a signature, either from the HwO or a Trusted Third Party (TTP), to enable cryptographic validation of the information about the RHD 100 (e.g., the properties of the RHD 100).

Figure 3:
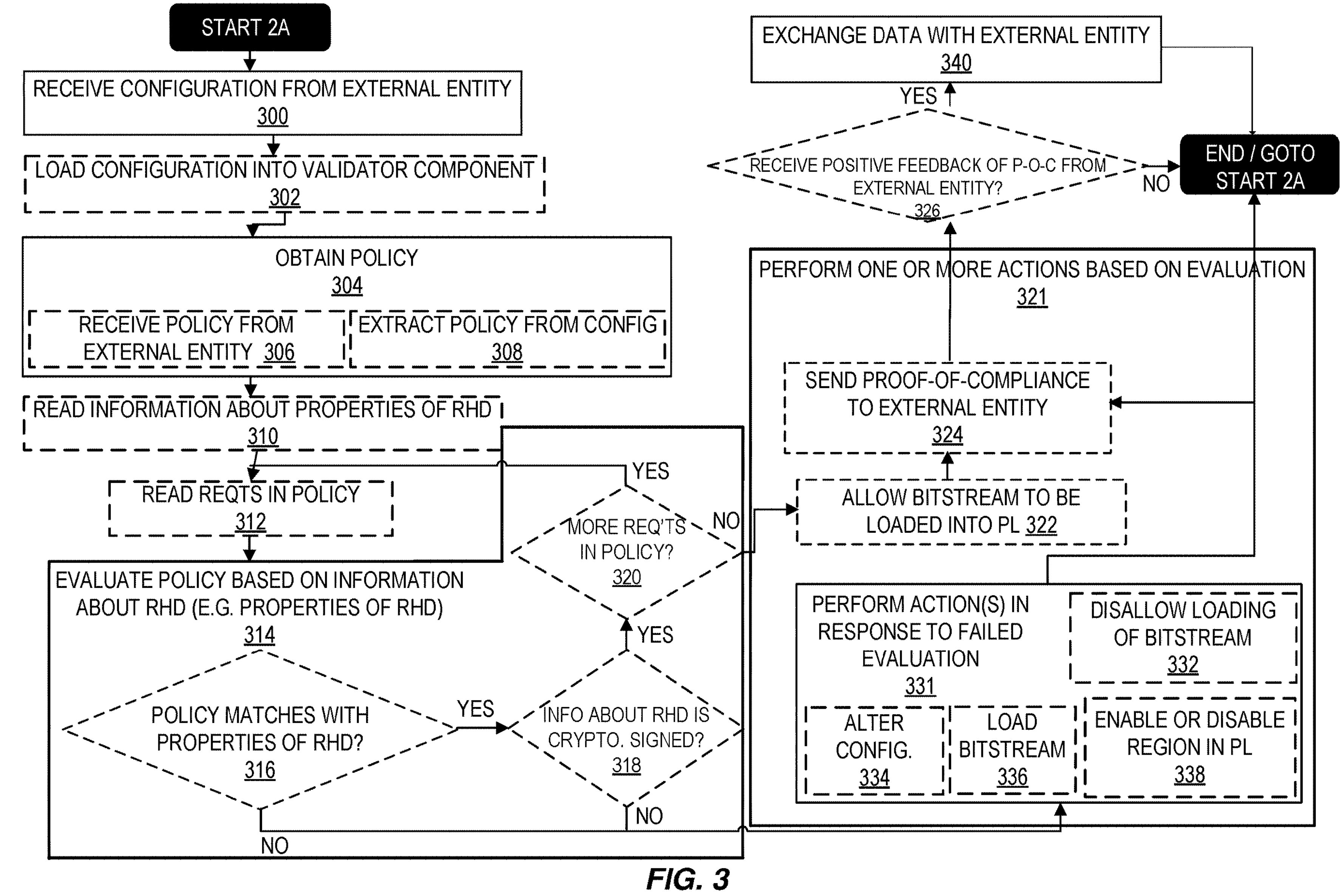
FIG. 3 is a flow chart of a usage phase in an RHD in accordance with some embodiments of the present disclosure.

FIG. 3 is a flow chart of the usage phase in accordance with some embodiments of the present disclosure. In the usage phase of Embodiment 1, the external entity 102 has requested an RHD from the CSP and has been given access to the RHD 100, e.g., as an IaaS offering. The HwO may also provide a public key belonging to the RHD 100 used for checking the proof-of-compliance 124. The external entity 102 provides the configuration 118 for configuring the RHD 100. Depending on deployment mode, the HwO or the external entity 102 may need to sign or encrypt the bitstream to be accepted by the RHD 100.

In step 300, the RHD 100 receives the configuration 118 that is desired by the external entity 102. In (optional) step 302, the RHD 100 (e.g., the loader component 104) loads the configuration 118 into the validator component 106. In steps 304, 306, 308, the RHD 100 obtains the policy 120 (step 304), e.g., by receiving the policy 120 from the external entity 102 (step 306) or by extracting the policy 120 from the configuration 118 (step 308).

In (optional) step 310, the RHD 100 reads the information about the RHD 100 (e.g., the properties of the RHD 100) from the memory 110. In (optional) step 312, the RHD 100 (e.g., the validator component 106) reads requirements in the policy 120.

In steps 314 to 338, the RHD 100 evaluates the policy 120 based on the information about the RHD 100 (e.g., the properties of the RHD 100) (step 314). More specifically, in one embodiment, in order to evaluate the policy, the RHD 100 (e.g., the validator component 106) determines whether the policy 120 matches the information about the RHD 100 (e.g., the properties of the RHD 100) (step 316). Here, the policy 120 "matches" the information about the RHD 100 (e.g., the properties of the RHD 100) if, based on the information about the RHD 100, the RHD 100 (e.g., the validator component 106) determines that the information of the RHD 100 satisfy one or more associated requirements included in the policy 120. If the policy 120 matches the information of the RHD 100 (step 316, YES), optionally, the RHD 100 (e.g., the validator component 106) may check whether the information of the RHD 100 are correctly cryptographically signed (step 318). If the information about the RHD 100 (e.g., the properties of the RHD 100) is correctly cryptographically signed (step 318, YES), the RHD 100 (e.g., the validator component 106) determines whether there are more requirements included in the policy 120 that need to be checked (step 320). If so (step 320, YES), the process returns to step 312 to read the next requirement from the policy 120 and then steps 316-318 are repeated for this next requirement. If there are no more requirements in the policy 120, the process proceeds to step 322. Thus, in other words, the policy 120 may include multiple requirements where steps 316, 318, and 320 may be performed to individually check each of the multiple requirements included in the policy 120. If all of the requirements in the policy 120 are satisfied (step 316, YES) and, optionally, if the authenticity of the information about the RHD 100 (e.g., the properties of the RHD 100) can be verified by a cryptographic signature (step 318, YES), evaluation of the policy 120 is successful. Otherwise, if any of the requirements in the policy 120 are not satisfied (i.e., step 316, NO) or, optionally, if the information about the RHD 100 (e.g., the properties of the RHD 100) cannot be authenticated and authorized (step 318, NO), evaluation of the policy 120 is unsuccessful.

In step 321, the RHD 100 then performs one or more actions based on the result of the evaluation of step 314. More specifically, in one embodiment, if evaluation is successful, the RHD 100 (e.g., the validator component 106) allows the bitstream 119 comprised in the configuration 118 to be loaded into the PL 108 (step 322).

In one embodiment, if the evaluation in step 314 was unsuccessful, the RHD 100 may perform actions in response to the failed evaluation (step 331). For example, the actions may comprise (i) disallowing loading of at least one bitstream comprised in the configuration 118 into at least one region of PL 108 (step 332); (ii) altering the configuration 118 by loading an altered version of the bitstream 119 into at least one region of PL 108 (step 334); (iii) loading at least one bitstream 119 comprised in the configuration 118 into at least one region of PL 108 (step 336); (iv) enabling or disabling at least one region of PL 108 (step 338); or (v) any combination of (i)-(iv).

In step 324, the RHD 100 (e.g., the validator component 106) provides the proof-of-compliance 124 to the external entity 102. The proof-of-compliance 124 may contain the information about the RHD 100 (e.g., the properties of the RHD 100) which are complied or are non-complied with the policy 120. Optionally, to ensure that the proof-of-compliance 124 is not a replay of an earlier proof-of-compliance, the proof-of-compliance 124 may contain a cryptographic signature and/or a nonce provided in the configuration 118.

In step 326, the RHD 100 may receive feedback of the proof-of-compliance 124 from the external entity 102. If the feedback of the proof-of-compliance 124 from the external entity 102 is positive (step 326, YES), it indicates that the external entity 102 may set up a secure channel for providing data to the RHD 100. Then, the RHD 100 may start exchanging data with the external entity 102 (step 340).

Also, the proof-of-compliance 124 may contain a hash chain of the policy contents 120. The attestation may be cryptographically certified by the RHD 100 utilizing its private key 116 to sign the proof-of-compliance 124. Given that the attestation returned the correct value, the external entity 102 receives a confirmation that the policy 120 has been fulfilled and that the RHD 100 is in a trustworthy state. Then, data may be exchanged with the RHD 100 for processing.

I.B. Alternative Embodiments of Embodiment 1

I.B.1. Mutually Trusted Third Party

In some of the embodiments described above, it may be assumed that there is a trust between the HwO and the external entity 102. It may be assumed that the HwO will not intentionally try to fool the external entity 102. This is not always the case, however, and the following paragraphs describe how a TTP, such as the chip manufacturer, may be included.

In one embodiment, the external entity 102 does not use the HwO as root-of-trust. For example, it is possible that the external entity 102 does not trust the HwO because the HwO may not refrain from placing IP owned by the external entity 102 in geolocation where the law allows extraction of data. Another example is that there is a risk of insider threats within the HwO where rogue employees with privileges access can trick the external entity 102 into exposing its data. In such cases, the information about the RHD 100 (e.g., properties of the RHD 100) must be provisioned by the TTP, e.g., the manufacturer of the RHD (as both the external entity 102 and the HwO must trust them in either case). It is also possible for the trusted third party to be a dedicated provisioning service.

During a registration phase, which may take place during the deployment phase described above, the information about the RHD 100 (e.g., properties of the RHD 100) is validated by the TTP. This may include inspecting that the RHD is present in a particular geolocation. Once the information about the RHD 100 (e.g., properties of the RHD 100) is written into the memory 110, the information about the RHD 100 (e.g., properties of the RHD 100) must be accompanied by a valid signature by the TTP, which also ties the information about the RHD 100 (e.g., properties of the RHD 100) to the identity of the specific RHD. In this case, the RHD properties may have the form {Value, SignTTP(ID, Value)}. The validator component 106 may perform cryptographic validation of the signature. This may either be done with a public key belonging to the TTP, which is stored in the RHD 100 or provided by the external entity 102.

The signature validation may also be done by the external entity 102 during the attestation phase, i.e., the validator component 106 only validates the information about the RHD 100 (e.g., properties of the RHD 100). In such a case, the signature is, instead, validated offline by the external entity 102 at a later point in time but prior to exposing data to the RHD 100. However, this variant would let the configuration 118 be deployed prior to having validated the authenticity of the information about the RHD 100 (e.g., properties of the RHD 100).

I.B.2. Initial Policy

The external entity 102 may wish to ensure that particular information about the RHD 100 (e.g., properties of the RHD 100) are fulfilled prior to allowing the configuration 118 to be loaded or prior to exposing data on the RHD 100. In some of the embodiments described above, the policy 120 is provided to the RHD 100, as a separate object, or is provided together with the configuration 118.

In other embodiments, the policy 120 may be provided differently. That is, the "initial policy" 122, which is a part of the policy 120 or an entirely different policy, is sent to the RHD 100 by the external entity 102 prior to sending the configuration 118. By using this method, the RHD 100 runs the initial policy 122 on the validator component 106 and returns the proof-of-compliance 124 to the external entity 102. The configuration 118 is only exposed after receiving the proof-of-compliance 124, which confirms that the information about the RHD 100 (e.g., properties of the RHD 100) is compliant with the initial policy 122.

After receiving the proof-of-compliance 124 with respect to the initial policy 122, the external entity 102 may provide the configuration 118 with an additional policy, e.g., requiring the hardware identifier (ID) that matches the ID of the compliant RHD 100. Additional steps may be taken to ensure that the configuration 118 is provided to the same RHD that provided the proof-of-compliance 124 with respect to the initial policy 122, e.g., by utilizing the public key 116 (stored in the RHD 100) to encrypt (parts of) the configuration 118.

Figure 4:
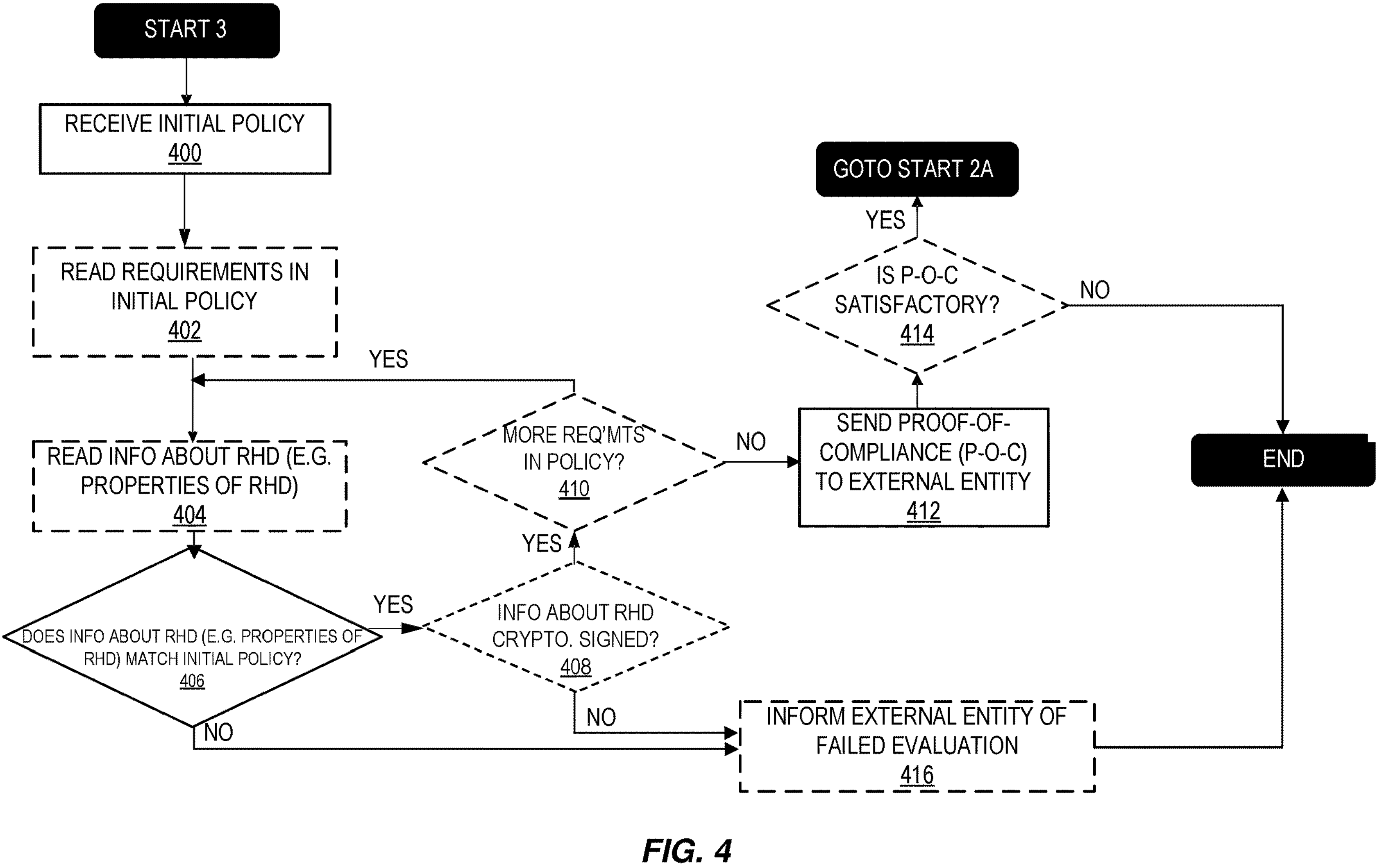
FIG. 4 is a flow chart of an embodiment involving an initial policy in accordance with some embodiments of the present disclosure.

FIG. 4 illustrates the following steps of the above-described method about the initial policy 122. In step 400, the RHD 100 receives the initial policy 122 from the external entity 102. In (optional) steps 402 and 404, the RHD 100 (e.g., the validator component 106) reads the requirements stated in the initial policy 122 (step 402) and reads the information about the RHD 100 (e.g., the properties of the RHD 100) from the memory 110 (step 404). In step 406, the RHD 100 (e.g., the validator component 106) evaluates whether the information about the RHD 100 (e.g., the properties of the RHD 100) matches with the initial policy 122. If the information about the RHD 100 (e.g., the properties of the RHD 100) does not match with the initial policy 122, the validator component 106 informs the external entity of the failed evaluation (step 416, NO).

In (optional) step 408, if the information about the RHD 100 (e.g., the properties of the RHD 100) matches with the initial policy 122, the RHD 100 determines whether the information about the RHD 100 (e.g., the properties of the RHD 100) is correctly cryptographically signed. If the information about the RHD 100 (e.g., the properties of the RHD 100) is cryptographically signed in the step 206 of the deployment phase, the RHD 100 may contain a public key that may be used to evaluate that the authenticity of the cryptographic signature and the information about the RHD 100 (e.g., the properties of the RHD 100) has not been tampered with. The RHD 100 may also load a private key to enable signing of the proof-of-compliance 124 at a later stage. In (optional) step 410, the RHD 100 determines whether there are more requirements in the initial policy. If YES, the above (optional) step 404 is performed. If NO, the next step 412 is performed.

In step 412, the RHD 100 sends the proof-of-compliance 124 to the external entity 102. The proof-of-compliance 124 may comprise the information about the RHD 100 (e.g., the properties of the RHD 100) that may be complied or not with the initial policy 122. To ensure it is not a replay of an earlier proof-of-compliance, the proof-of-compliance 124 may contain a cryptographic signature and/or a nonce supplied in the configuration 118. In (optional) step 414, the external entity 102 evaluates the proof-of-compliance 124. If the proof-of-compliance 124 is satisfactory, the external entity 102 proceeds to the step 300 illustrated in FIG. 3.

I.B.3. Policy Altering the Configuration

Above, at least in some aspects, the policy 120 is only considered for a fail/pass-scenario where the configuration 118 is loaded if the requirements in the policy 120 are fulfilled by the RHD 100 and otherwise, the external entity 102 does not utilize the RHD 100. In other words, in some of the embodiments described above, the validator component 106 either allows or disallows the configuration 118, as a whole, to be loaded depending on the policy 120.

In another embodiment, the validator component 106 has additional capabilities to change the behavior of the configuration 118, rather than declining the deployment of the configuration 118. As described above and illustrated in FIG. 3, when the policy 120 does not match with the information about the RHD 100 (e.g., properties of the RHD 100), the RHD 100 may perform the actions in response to the failed evaluation of the policy 120 (step 331). One of those actions is to alter the configuration 118 (step 334). The action of altering the configuration 118 may be implemented by many different methods. For example, the loader component 104 of the RHD 100 may load different software components into the PL 108 in response to the failed evaluation of the policy 120. That is, loading different software components is a method of altering the configuration 118.

For example, a telecom operator may provide coverages in multiple legal jurisdictions where requirements for data exchange or extraction differ. By altering the configuration 118, as disclosed in step 334 of FIG. 3 in the present disclosure, the telecom operator may make sure that, within one legal jurisdiction, the processing is accelerated using a cryptographic function fulfilling legal requirements for that specific jurisdiction. This makes it easier for the telecom operator providing coverage in multiple legal jurisdictions to comply with local regulations.

I.B.4. Validator as a Part of the PL

In some embodiments, the validator component 106 is present on the RHD 100. In other words, the validator component 106 is embodied by a hardware or software component that utilizes a hard IP or preferably a dedicated CPU to run. In this alternative embodiment, the validator component 106 is, instead, implemented as a part of the PL 108. Also, the policy 120 may be provided differently from what is described above. In some embodiments, the validator component 106 is either a part of the hardware or supplied by the HwO. In one embodiment, the validator component 106 is, instead, provided by the external entity 102, which is illustrated in FIG. 5, FIG. 6, and FIG. 7.

Figure 5:
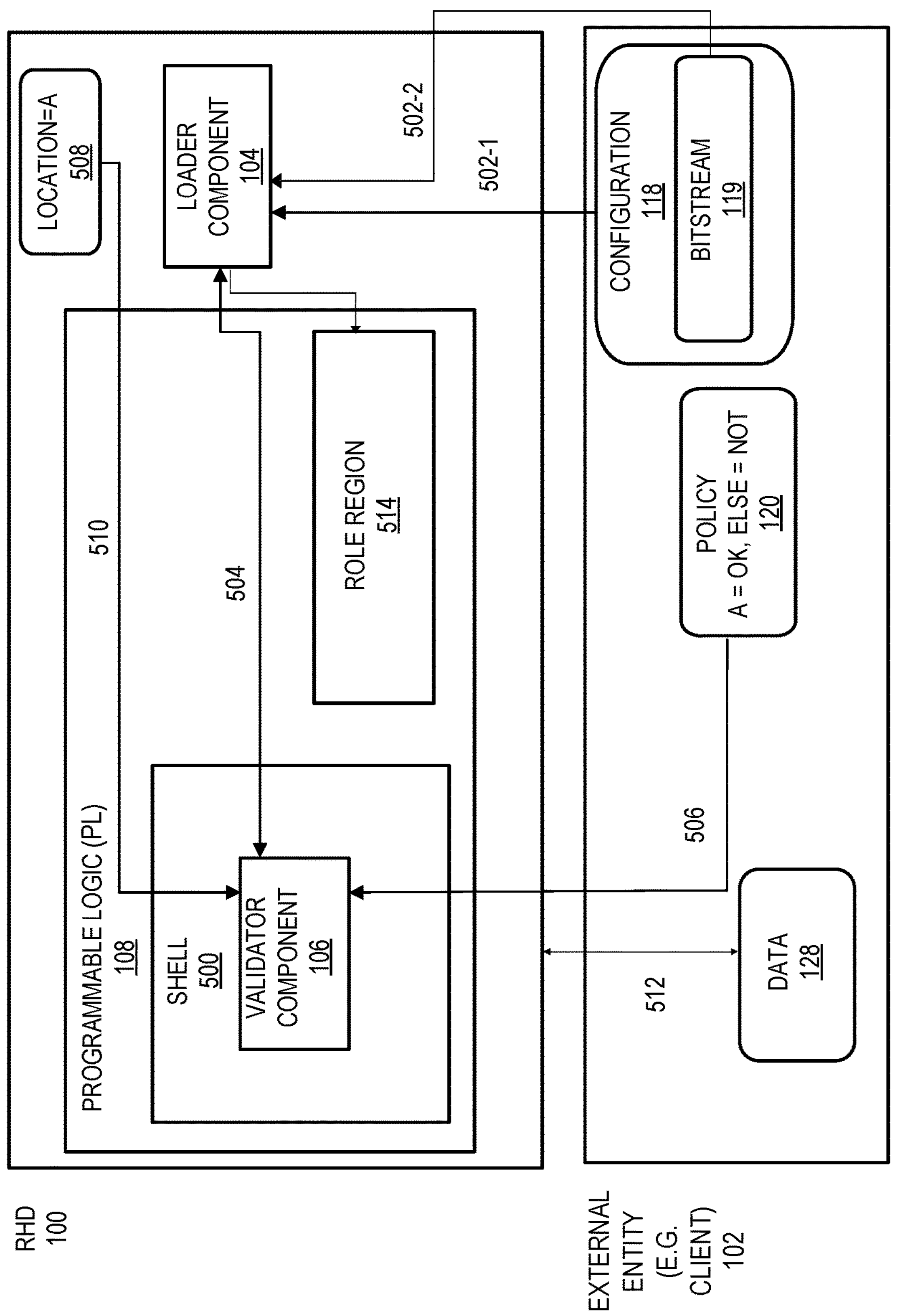
FIG. 5 illustrates an example implementation of an embodiment where the validator component is located in the shell of the Programmable Logic (PL)

FIG. 5 illustrates an example implementation of an embodiment where the validator component 106 is located in the shell 500 of the RHD 100. In this embodiment, the loader component 104 may receive the configuration 118 or the bitstream 119 (steps 502-1, 502-2). The configuration 118 or the bitstream 119 may comprise the validator component 106 as a software component. The loader component 104 may provide the validator component 106 (included in the configuration 118 or the bitstream 119) to the shell 500 in the PL 108 (step 504). Then, the validator component 106 (the software component) can run in a soft CPU in PL 108.

For example, the policy 120 may state that the RHD's data exchange with the external entity 102 is allowed only if the location of the RHD 100 is "A." When the policy 120 is provided to the validator component 106 (step 506), the validator component 106 checks the location of the RHD 100 with the stored information 508 (step 510). When the validator component 106 determines that the location of the RHD 100 is "A," the RHD 100 and the external entity 102 may start exchanging data (step 512). Also, the PL 108 may comprise a "role region" 514 (in other words, the programmable plane), which is a part of the device available to the end-user for deploying bitstreams and applications. The validator component 106 may be placed in the role region 514 as explained below.

Figure 6:
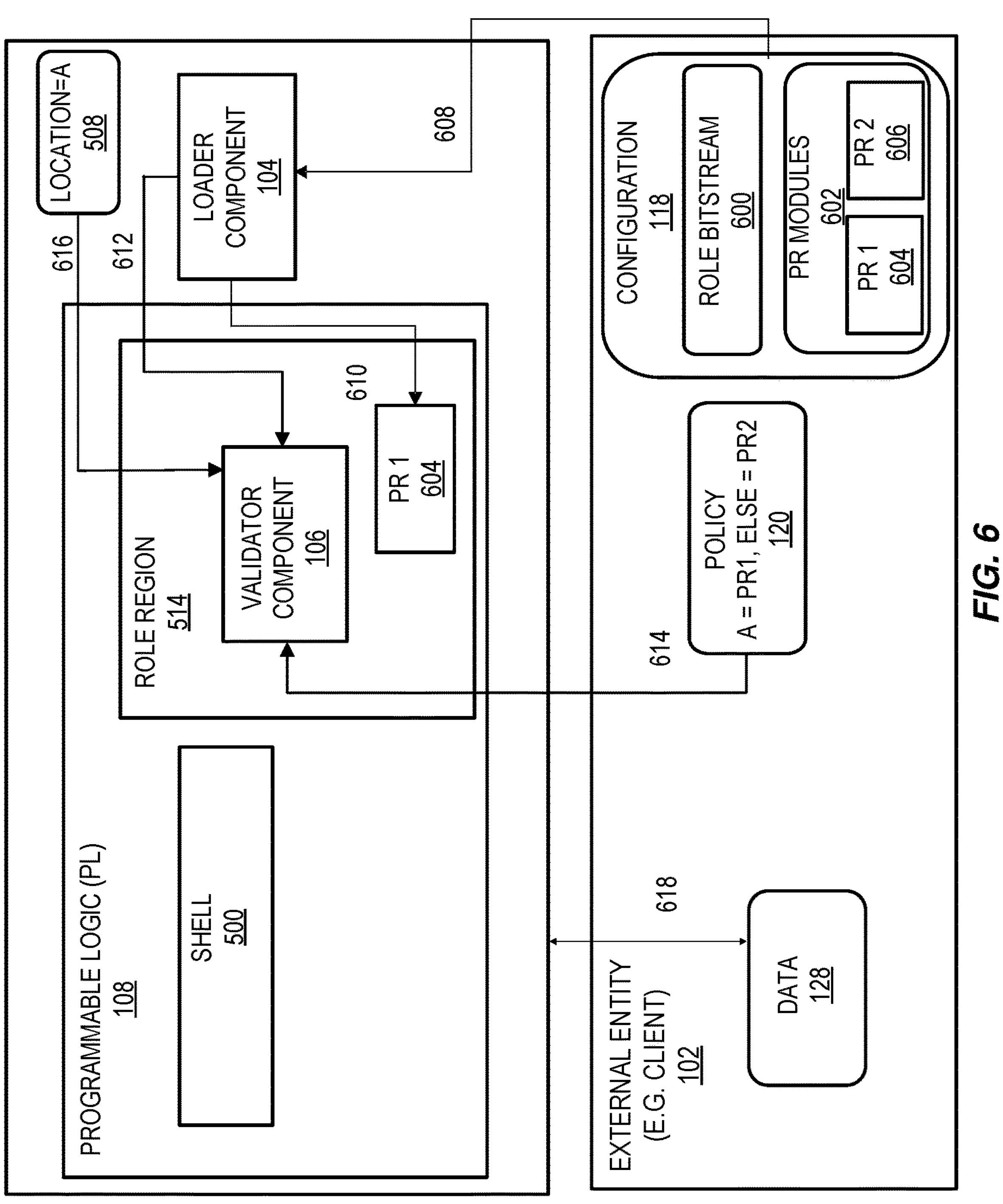
FIG. 6 illustrates an example implementation of an embodiment where the validator component is implemented as a part of a role.
Figure 7:
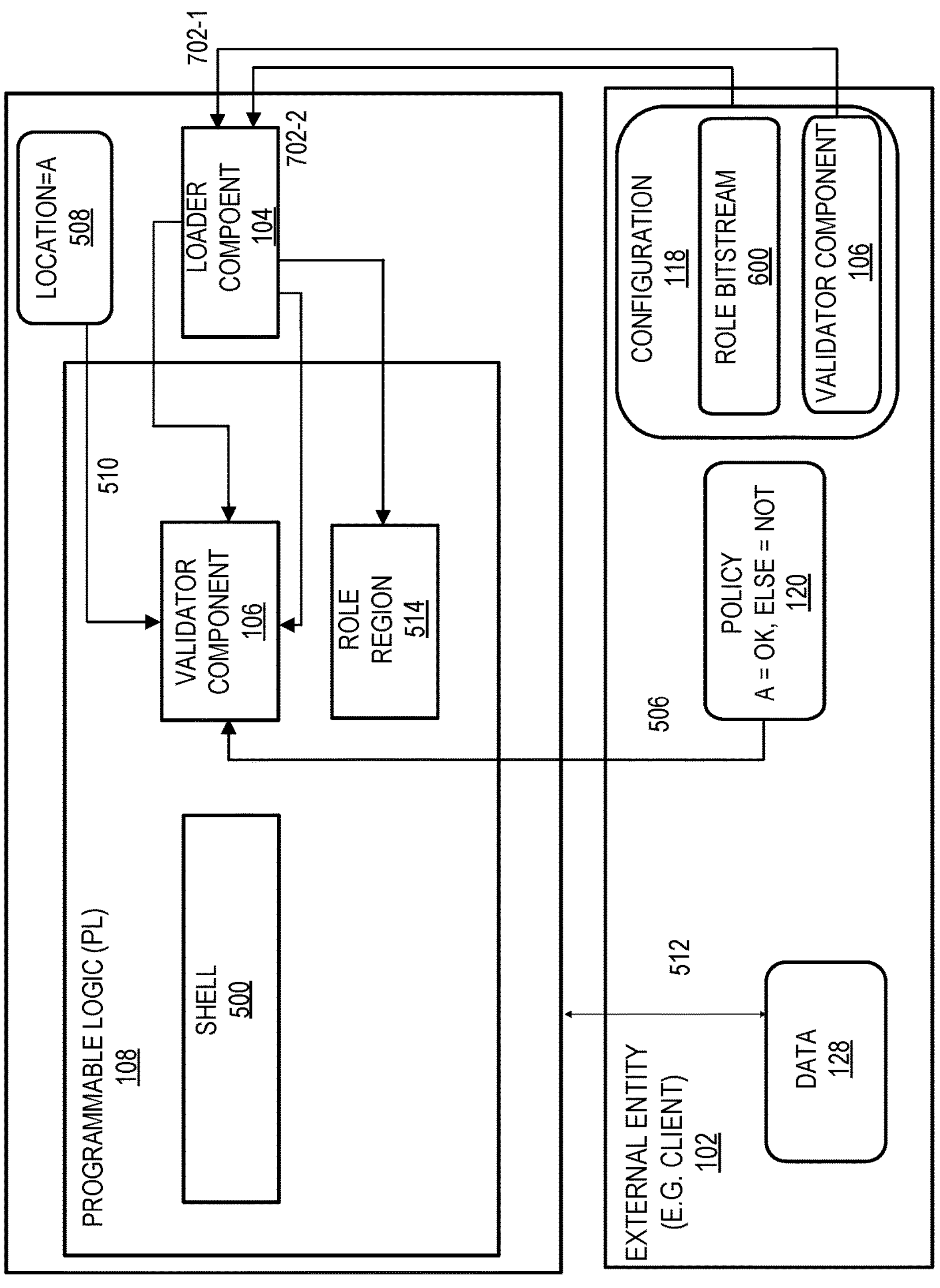
FIG. 7 illustrates an example implementation of an embodiment where the validator component is implemented as a dedicated Partial Reconfiguration (PR) region.

FIG. 6 illustrates an example implementation of an embodiment where the validator component 106 is implemented as a part of the role region 514. In this embodiment, it is assumed that a Partial Region (PR) within the role region 514 is supported. The configuration 118 may comprise 'the role bitstream with a validator' 600 and PR modules 602 (PR 1 604 and PR 2 606). The loader component 104 may receive the configuration 118 from the external entity 102 (step 610). Then, the loader component 104 may provide the PR 1 604 to the role region 514 (step 610). The validator component 106 may receive values of the configuration 118 from the loader component 104 and decide how the PR 1 604 should function (step 614). The validator component 106 may receive the policy 120 from the external entity 102. The policy 120 may state that PR 1, which may comprise bitstreams or applications, is used if the location of the RHD 100 is "A" and PR 2 is used otherwise. The validator component 106 may check the location of the RHD 100 with the sensor 508 (step 616). If the location of the RHD 100 is "A", the validator component 106 may perform the PR 1 604 in accordance with the policy 120. Afterward, the data may be exchanged between the RHD 100 and the external entity 102 (step 618).

FIG. 7 illustrates an example implementation of an embodiment where the validator component 106 is implemented as a dedicated PR region of the configuration 118. In this embodiment, the configuration 118 may comprise the validator component 106, which is configured into a dedicated PR region, and the role region 514. The loader component 104 may receive the validator component 106 and the role bitstream 600, which are included in the configuration 118, from the external entity 102 (step 702). The received validator component 106 and the role bitstream 600 are placed in the PL 108. Then, the validator component 106 may perform the steps 506, 510, and 512, which are described above and also illustrated in FIG. 5.

In the embodiments illustrated in FIG. 6 and FIG. 7, the policy 120 is used as an input when creating the bitstream. Hence, the policy 120 becomes an integrated part of the PL 108. Similarly, as described below, partial enabling/disabling of functionality in the programmable logic 108 can be realized by implementing different clock regions for different functions with the programmable logic 108 and enabling/disabling them via configuration registers.

I.B.5. Disabling Partial Regions

Figure 8:
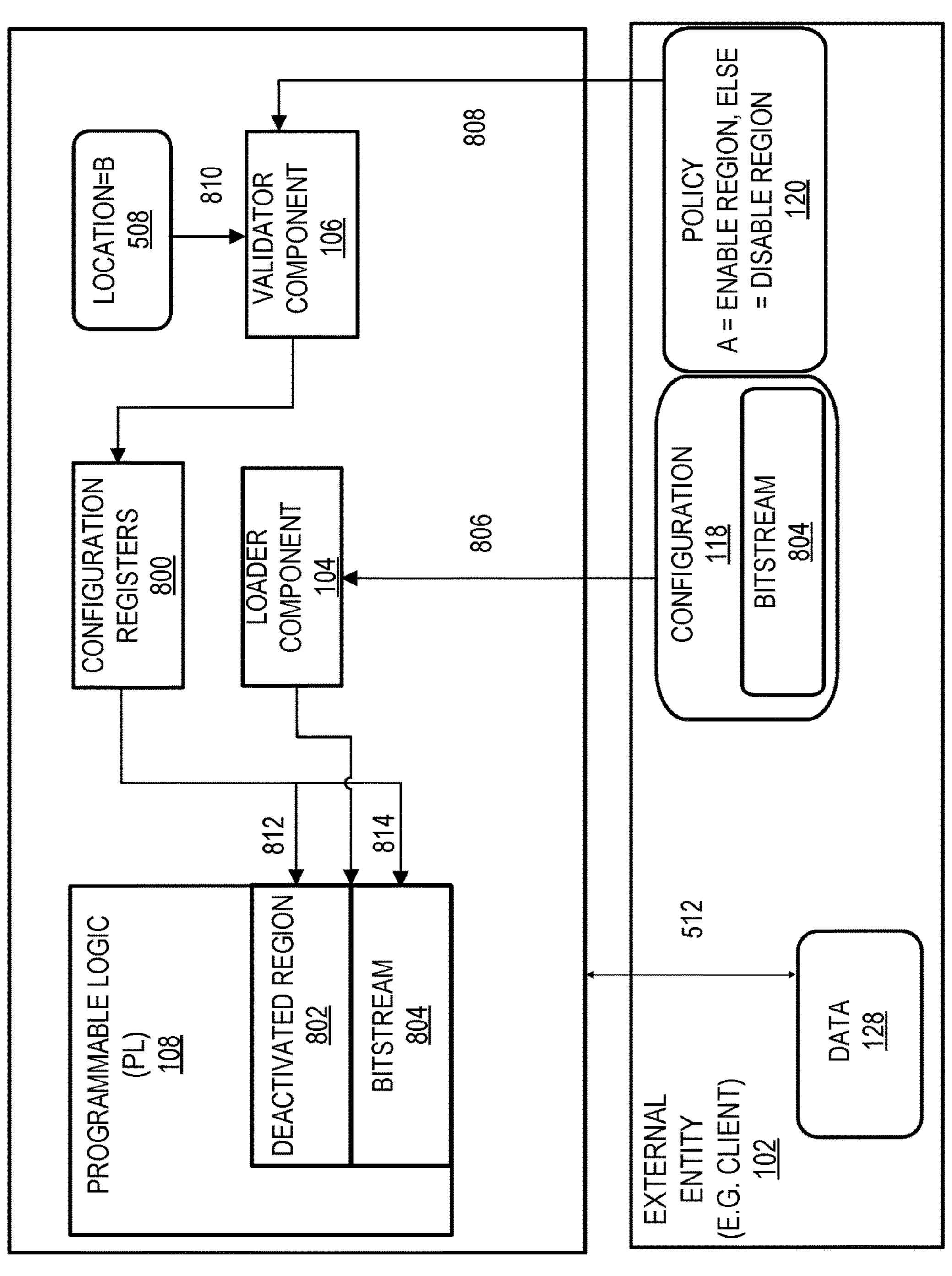
FIG. 8 illustrates an example implementation of an embodiment where the validator configuration uses configuration registers to control which parts of the programmable logic is active by enabling and disabling clock regions.

As described above and illustrated in FIG. 3, when the policy 120 does not match with the information about the RHD 100 (e.g., properties of the RHD 100), the RHD 100 may perform the actions in response to the failed evaluation of the policy 120 (step 331). One of those actions is to enable or disable a partial region in the PL 108 (step 338). FIG. 8 illustrates an example implementation of an embodiment where the validator component 106 performs an example of the step 338. In this embodiment, the RHD 100 further comprises the configuration registers 800 and the PL 108 further comprises a deactivated region 802 and a bitstream 804 that is included in the configuration 118 received from the external entity 102 (step 806). The validator component 106 may receive the policy 120 (step 808). In this embodiment, the policy may state that the bitstream 804 in one region of the PL 108 is enabled if the location of the RHD 100 is "A" and if not, the region of the PL 108 is disabled. When the validator component 106 checks the location of the RHD 100 with the sensor 508 (step 810) and then determines that the location is not "A," the validator component 106 may use the configuration registers 800 to control the deactivated region 802 to deactivate the part of the region (step 812).

If the validator component 106 determines that the location is not "A", the RHD 100 (e.g., the validator component 106) may disable the clock signal or other driving signals (e.g., the initial reset) to certain parts of the PL 108. In other words, the PL 108 is present but since the PL 108 does not receive any driving signal, the PL 108 does not react to an input nor produces any output. The validator component 106 may e.g., use the configuration registers 800 to instruct the bitstream 804 (step 814) to deactivate region 802 by holding the clock signal. Another possible implementation for this is to give the PL 108 access to the information about the RHD 100 (e.g., the properties of the RHD 100) during runtime. This allows the PL 108 to use a state machine to change the behavior of the configuration 118. This embodiment can utilize the validator component 106 (provided by the external entity 102) as described in the above paragraphs of "1.B.4. Validator as a part of the PL."

II. Continuous Policy Monitoring on Reconfigurable Hardware Device

The above-proposed embodiments may be used for the RHD 100 in a cloud deployment. Also, the same RHD 100 may be implemented in moving objects like a vehicle or a drone, as disclosed below.

II.A. Background

II.A.1. RHDs in Moving Objects

As the RHD 100 offers low latency without sacrificing throughput (compared to, e.g., Graphics Processing Unit (GPU) where you can get either low latency or throughput or not both), the RHD 100 is commonly used for signal processing, machine learning inference (i.e., AI computations), and moving objects that require image processing or exact real-time positionings, such as Unmanned Aerial Vehicles (UAVs), Unmanned Ground vehicles (UGVs), Unmanned Underwater Vehicles (UUV), Remotely Piloted Aircraft (RPA), and self-driving vehicles. The RHD 100 is especially advantageous for objects that the processing must be updatable, for example, to enable new functionality or more efficient algorithms/implementations. Using the RHD 100 allows a manufacturer to update the configuration 118 over the same interface as for software updates, as opposed to using other components that would require hardware replacement.

II.A.1.a. Encrypting Data Traffic in Different Jurisdictions

Data encryption is a subject that is regulated by law which often differs in different jurisdictions. For one example, in jurisdiction A, the data may be encrypted with any cryptographic algorithm. However, in jurisdiction B, the data may only be encrypted with one specific cryptographic algorithm. Similarly, some countries have export restrictions on cryptographic algorithms stating that certain cryptographic primitives may not be exported into a country, typically requiring short key length or weaker primitives. In this case, an encryption module must be reconfigurable or another encryption module must be loaded in the RHD 100 when the measurements and policy indicate that the vehicle having the RHD 100 has entered jurisdiction B. For another example, a particular encryption IP block may be only allowed to be used in jurisdiction A. In this case, when the policy indicates that the vehicle has entered jurisdiction B, the IP block must be deactivated or removed from the PL.

II.A.1.b. Drone with a Camera

In some geographical areas, such as protected or private properties, it may be illegal to collect videos or photographs. By using a policy where such areas are included, the drone may deactivate video processing and traverse such areas while still being compliant with regulations. The drone may include the RHD 100 that receives, stores, and uses the policy related to the geographical areas where the drone flies over. The UAS Traffic Management (UTM), as defined in the below section of "Unmanned Aerial Systems," may be seen as an authority with regulatory interest and could find the ability to use helpful policies.

II.A.1.c. Self-Driving Cars (Traffic Rules)

As self-driving cars utilize the RHD 100 for machine learning inference, the RHD 100 may have to be updated when the driving conditions of the self-driving cars change. Examples of the driving conditions include off-road driving, icy roads or different traffic regulations and norms in different countries. The most extreme example of different behavior is likely left-hand or right-hand driving, e.g., the Dover-Calais tunnel. In such a case, the RHD 100 of the self-driving car may be reconfigured to interpret the different traffic situations correctly.

II.A.2. 3GPP Network Functionality

II.A.2.a. Mobility Restrictions

3GPP standards describe numerous ways in which a network may restrict a User Equipment (UE). For example, clause 5.3.4.1.1 in 3GPP TS 23.501 ("System architecture for the 5G System (5GS); Stage 2 (Release 17)") mentions several mechanisms that may be applied in order to restrict a UE's capabilities. Service area restriction is a way to divide areas of a Public Land Mobile Network (PLMN) into allowed and non-allowed areas. The UE may normally communicate with the network in an allowed area but is not able to request services or set up connections for control/user plane in a non-allowed area. The restrictions are tied to the UE's subscription. In a forbidden area, a UE is forbidden to initiate any communication with the network within an area for a PLMN. The forbidden area is similar to the non-allowed area above but the forbidden area is stricter as a non-allowed area allows for the UE to register to the network. Forbidden areas are tied to the UE's subscriptions. More related ways of service area restriction are described in the clause 5.3.4.1 of 3GPP TS 23.501.

II.A.2.b. Unmanned Aerial Systems

3GPP TR 23.754 V17.1.0 (2021-03) ("Study on supporting Unmanned Aerial Systems (UAS) connectivity, Identification and tracking (Release 17)") describes a study to capture necessary features to support Unmanned Aerial Systems (UAS) within the 3GPP system. In particular, FIG. 4.3-1 of 3GPP TR 23.754 illustrates an overview of UAV architecture in a 3GPP System. A UAS may comprise a UAV and an Unmanned Aerial Vehicle controller (UAVc). The feature of a UTM enables receiving information about the UAVs connected through the 3GPP network. This would typically happen over the UAV9 interface and could be tracking information or command and control messages among other things. The UTM could also communicate with a networked UAV controller over the UAV9 interface. Connectivity for Command and control of a UAV may be established between the UAV and a UAVc, or a Third Party Authorized Entity (TPAE), or the UTM. Only one entity may control the UAV at a given time. It is also encouraged in the study that the 3GPP network should provide means for the UTM to perform geofencing and geocaging.

II.A.2.c. Vehicle-to-Everything (V2X)

During Release 16, 3GPP has extended the support for V2X services. For example, 3GPP TS 23.287 V17.0.0 (2021-06) ("Architecture enhancements for 5G System (5GS) to support Vehicle-to-Everything (V2X) services (Release 17)") contains the architectural parts. A UE may perform V2X communication over the Uu interface or the PC5 interface, where the PC5 interface is used to directly communicate with another UE without Radio Access Network (RAN) involvement. The related configuration of the UE needed to utilize the PC5 interface is achieved by receiving configuration data or updates from either a V2X Application Server or Policy Control Function (PCF). The related configuration of the UE may also be preconfigured in the Mobile Equipment (ME) or Universal Integrated Circuit Card (UICC). When a UE is authorized to be "served by Evolved Universal Terrestrial Radio Access (E-UTRA)" or "served by New Radio (NR)," the UE can be configured in addition to being authorized to communicate over the PC5 interface on a per PLMN basis. It may also be possible that the UE is "not served by E-UTRA" and "not served by NR." The UE can still be authorized for PC5 communication. Related radio configuration for the PC5 interface is also provided, for example, frequency bands to use and geographical area(s). Clauses 5.1.2 and 5.1.3 of 3GPP TS 23.287 V17.0.0 (2021-06) disclose the full set of configurable parameters.

II.A.2.d. Broadcasted Information

The 3GPP system broadcasts information in order for a UE to be able to identify and register with a PLMN. Every PLMN broadcasts the Master Information Block (MIB) that contains information on how to decode a second message, which is needed in order to register with a PLMN. The second message is referred to as SystemInformationBlockType1 (SIB1) and contains useful configuration parameters for the UE in order to continue the process of registering with a PLMN. The SIB1 message also includes the PLMN-ID that is a digit code consisting of a Mobile Country Code (MCC) and Mobile Network Code (MNC). The MCC identifies the country and the MNC identifies the specific operator. Each PLMN-ID is globally unique.

II.A.2.e. Location Services

3GPP TS 23.273 V17.1.0 (2021-6) ("5G System (5GS) Location Services (LCS); Stage 2 (Release 17)") specifies location services for the 5G system. One feature is the UE Mobile Originated Location Request. This feature allows the UE to request help from the serving network to obtain information on where the UE is located. This feature also allows the UE to request a certain level of accuracy or response time where the response will indicate if these levels are met.

II.A.3. Trusted Hardware

The concept of remote attestation is a method where a client can remotely authenticate the hardware and software of a remote device such as the RHD 100. It is used in trusted or confidential computing and is fundamental for setups where the remote device should be trusted for deployment or usage. Well-known examples are TPM and Intel Software Guard extensions (SGX). Basically, the idea of remote attestation is that the attester obtains information certifiably bound to a cryptographic key, which determines the identity of the device to be attested. Properties related to that cryptographic key, like ownership and trustworthiness, may be typically provided by an external party, like a Trusted Third Party (TTP). It is also possible to get further information from the device, like which software is running on the device or who is the provider of that software. When attestation is finalized, a trusted channel can be created between the attester and the remote device. On an RHD 100, commercialized alternatives to technologies (such as the SGX) do not exists. Thus, one cannot attest the contents of the PL 108 of the RHD 100. There are, however, academic studies proposing solutions on how this trust can be achieved. See e.g., Niklas Lindskog and Håkan Englund, *Secure acceleration on cloud-based FPGAs—FPGA enclaves*, TechRxiv, 2020 Dec. 21.

II.B. Problems with Existing Solutions

Some patents exist in the field of autonomous or semi-autonomous vehicles changing behavior due to external measurements. However, only a few of these cover the FPGA. For example, U.S. Pat. No. 10,528,765 B2 to Smith et al. describes a solution where a bitstream is remotely loaded to the FPGA. An external entity, such as a management server, decides which bitstream should be loaded at a certain point in time. Each bitstream may be connected to a policy that decides under what circumstances the bitstream is allowed to be loaded.

U.S. Pat. No. 10,657,830 B2 to Gordon et al. ("Operation of an aerial drone inside an exclusion zone") and U.S. Pat. No. 10,678,266 B2 to Erickson et al. ("Method and system for continued navigation of unmanned aerial vehicles beyond restricted airspace boundaries") describe solutions for restricting a drone to fly in particular geographical locations. In U.S. Pat. No. 10,657,830 B2 to Gordon et al., the geographical area is negotiated between the aerial drone and a drone controller device. In U.S. Pat. No. 10,678,266 B2 to Erickson et al., a navigation system for remotely controlling UAV entering restricted areas is described, where certain functionality of the UAVs is deactivated or are given a route out of the restricted area.

U.S. Pat. No. 10,248,410 B2 to Lin et al. ("Implementation decision to provide ADAS function update for a vehicle") describe a solution where an FPGA installed in a vehicle can be reprogrammed after receiving a message from a roadside unit about the locations of other vehicles. U.S. Patent Application Publication No. 2019/0228666 A1 to Lassini ("System and Method for Reconfiguring a System-On-Module for an Unmanned Vehicle") describes an update procedure for a UAV system with redundant processing systems, one can be updated while the other(s) continues to operate. It also describes how a processing unit may monitor a PL component on each processing system to detect if it has been compromised and if so, reprogram the PL on the same processing system. It supports the monitoring of partial configuration. Another prior art is the soft IP from Xilinx called Security Monitor. The Security Monitor's task is to augment existing silicon security features with post-configuration anti-tamper protection, i.e., it monitors internal signals such as temperature, voltage and JTAG activity. Any partial reconfiguration (PR) activity may also be monitored. If the measurements fall outside of the allowed intervals, the IP may erase keys/memory and lock down the entire FPGA by driving a global reset signal.

However, those patents do not teach or suggest solutions for moving objects using the FPGA (or the RHD 100) to automatically change or restrict their functionality depending on external or internal measurements, such as a geographical location. None of those patents cover how to utilize an FPGA in these situations or how to manage a trusted policy for the FPGA. U.S. Pat. Nos. 10,528,765, 10,657,830, 10,678,266, and 10,248,410 require an active external party to update the RHD configuration. U.S. Pat. No. 10,528,765 B2 to Smith et al. requires external interaction from a management server to load new bitstreams and is not suitable for a solution where the FPGA is not stationary. U.S. Pat. Nos. 10,657,830, 10,678,266, and 10,248,410 do not use a policy that is known to the FPGA. Although U.S. Pat. No. 10,248,410 B2 to Lin et al. is suitable for vehicles, the disclosure of U.S. Pat. No. 10,248,410 requires roadside units and measurements from other vehicles nearby. U.S. Pat. Nos. 10,657,830 and 10,678,266 only mention the FPGA as one possible implementation strategy and does not specify any details on how the system would utilize FPGA functionality. U.S. Patent Application Publication No. 2019/0228666 A1 to Lassini primarily uses reconfiguration to recover from a security breach and typically would reconfigure the device with the same bitstream or try to fetch an update from a remote server. The goal of U.S. Patent Application Publication No. 2019/0228666 A1 to Lassini is not to alter the behavior of the bitstream.

Also, non-patent references do not teach or suggest solutions for moving objects using the FPGA (or the RHD 100) to automatically change or restrict their functionality depending on external or internal measurements, such as a geographical location. For example, the purpose of the IP block described in Xilinx's document ("Secure Monitor IP") is to enforce secure shut-down of a compromised RHD, where critical information can be erased and the RHD can be put in a locked state until it is power-cycled. However, the IP block described in Xilinx's document does not support reconfiguration nor temporary disablement of certain PL regions/processes. While it "supports" PR, this only includes monitoring of such activity. The IP is not able to reconfigure the bitstream nor load any SW components.

Certain IP blocks have different licensing agreements in different jurisdictions and may therefore only be deployed in certain geographical areas. An example of such is cryptographic IP blocks that may be susceptible to export restrictions, as described in Wikipedia ("Export of cryptography from the United States"). Similarly, certain AI and machine learning models may be optimized for certain environments and locations and may benefit from being exchangeable.

II.C. Proposed Solutions

The present disclosure enables moving objects (such as a vehicle, a drone, and a factory robot using the RHD 100) to apply policies and external and internal measurements from sensors are evaluated in accordance with the policies. The policy may comprise at least one rule taking at least one threshold for at least one measurement type and defining at least one action on at least one target. For example, the action may disable particular functionality in the RHD 100 or reconfigure (a part of) the PL.

Based on such a policy, the validation component 106 in the RHD 100 may continuously monitor the measurements received from sensors. When any threshold is exceeded/surpassed or falls short of, such that the evaluation of any rule changes, the resulting effect is enforced by the validator component 106. Examples may include (a) disabling particular RHD functionality, such as data encryption, when the entity enters particular geographical areas or (b) loading another machine learning model, by reconfiguring (a part of) the PL, to cope with changes in wind speed or temperature. To enable this method of continuous monitoring of the measurements, the vehicle may receive external measurements from external stations, such as positioning satellites or mobile network base stations. The vehicle may also receive internal measurements such as device temperature or remaining battery power. These internal measurements are fed from the sensors to the validator component 106 on the RHD 100, which in turn controls the PL configuration of the reconfigurable hardware component.

The present disclosure comprises the RHD 100 placed in a moving object where the RHD 100 is configured to receive the above-described external or internal measurements related to the RHD 100. Those measurements related to the RHD 100 may include positioning, (positioning satellites, mobile network base stations, Wi-Fi networks etc.), environmental conditions (temperature, wind, rainfall etc.), proximity to other objects and remaining battery power. The RHD 100 may also be configured with the policy 120 that includes thresholds and actions connected to exceeding or surpassing the thresholds. Those measurements and the policy 120 are interpreted by the validator component 106 in the RHD 100 and used to perform these actions. The actions may comprise deactivating programmable logic regions or loading new components such as bitstreams or software modules.

By adopting the embodiments in the present disclosure, the RHD 100 may be used to quickly change the behavior of a moving object (e.g., a vehicle) when encountering a new location or environmental condition. A few examples include: (a) to enable the moving object to switch between machine learning models for different traffic or environmental situations without any interaction with the user; (b) to enforce particular cryptographic restrictions in jurisdictions where encryption of data requires particular algorithms or is forbidden entirely; (c) to ensure that the moving object (e.g., drones) may be forced to stop image processing or fly on a certain altitude in a certain geographical area. Some of the embodiments in the present disclosure implements the configuration of the RHD's behavior from inside of the RHD 100. This gives a lower latency of the update compared to a solution where the reconfiguration is initiated from outside of the RHD, e.g., by loading a different bitstream to the RHD 100. The need for low latency of updates is especially relevant in cases where a moving object needs to update its behavior or configuration during the operations. Another advantage of configuring the RHD's behavior internally may be seen in cases where attempts to manipulate the configuration is a concern and the measurements on which the configuration is based on are not dependent on trust-related processing outside of the RHD. Thus, the trusted computing base can be limited to the RHD 100, which creates a smaller surface for an attack attempt.

II.C.1. Embodiment 2

Figure 9:
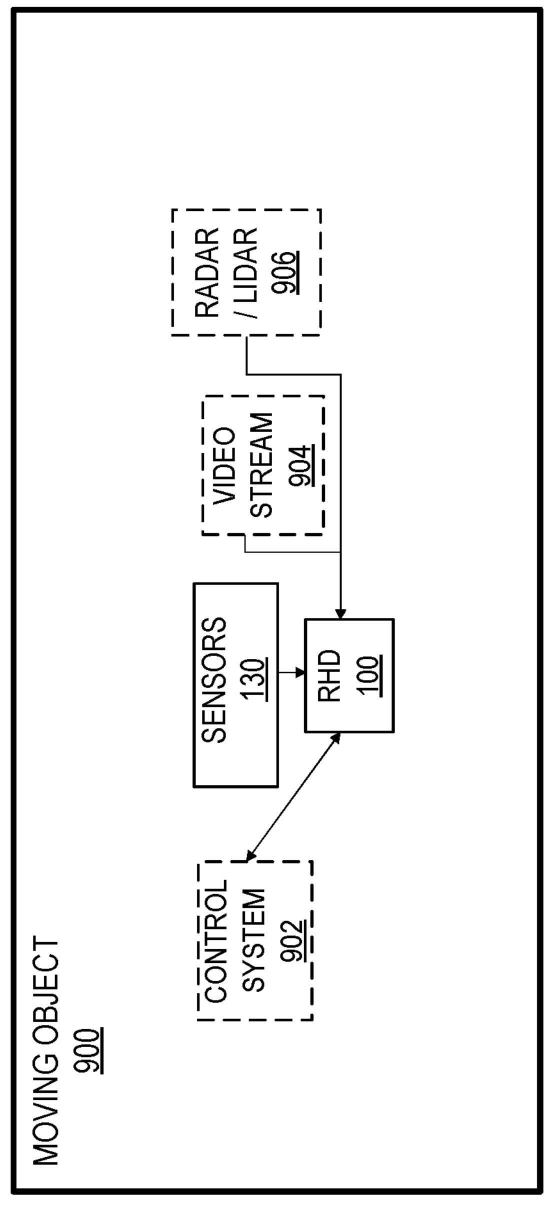
FIG. 9 illustrates an example of an RHD implemented in a moving object in accordance with some embodiments of the present disclosure.

In Embodiment 2, it is assumed the RHD 100 is placed on a moving object such as a self-driving car. FIG. 9 illustrates an example of the RHD X100 implemented in a moving object 900 in accordance with some embodiments of the present disclosure. As illustrated, the RHD 100 is connected with the sensors 130, and optionally, with a control system 902, a video stream 904, and Radio Detection And Ranging (RaDAR)/Light Detection And Ranging (Lidar) 906.

The sensors 130 either actively calculate or passively monitor external measurements. Such measurements may include geographical position, temperature, weather, or proximity to other objects. In some embodiments, the measurements may also be internal, comprising e.g. remaining battery power and status of hardware components. Some of the sensors 130 provide their values to the validator component 106 for policy inspection while others may provide data for other parts of the RHD 100 to process. The data processed in the RHD 100 is used to produce output which is provided to the control system 902. Examples of the control system 902 are brakes and steering systems. The RHD 100 may also be placed in any non-moving object and the proposed solutions of the present application are equally valid for any non-movable electronic equipment equipped with an FPGA.

Embodiment 2 comprises two distinct phases: a deployment phase for deploying the configuration 118 into the RHD 100 and a usage phase for performing one or more actions based on the policy 120 of the configuration 118. Optionally, Embodiment 2 further comprises an attestation phase, as described below.

Figure 10:
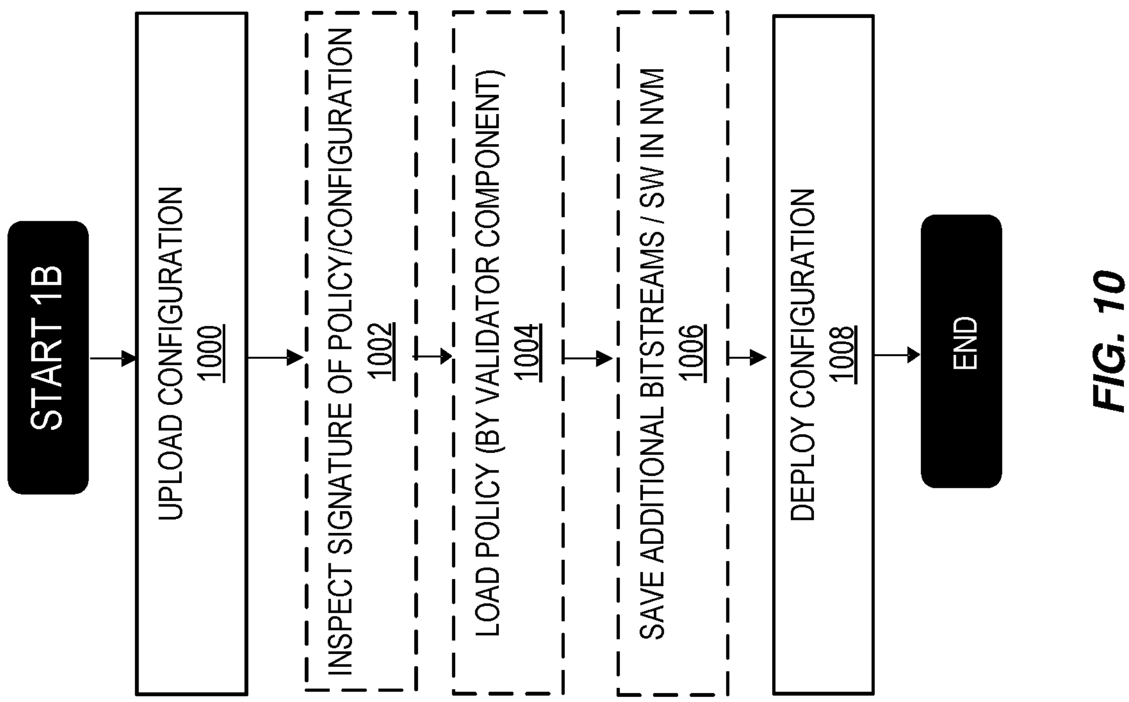
FIG. 10 is a flow chart showing the steps involved in a deployment phase in accordance with some embodiments of the present disclosure.

FIG. 10 is a flow chart showing the steps involved in the deployment phase in accordance with some embodiments of the present disclosure.

In step 1000, a user or a TTP uploads the configuration 118 in the RHD 100. If the user uploads the configuration 118, this step is done after manufacturing of the RHD 100. In contrast, the TTP may upload the configuration 118 as a step in the manufacturing process of the RHD 100. The configuration 118 is stored in non-volatile memory of the RHD 100 to survive power cycles.

In (optional) step 1002, a cryptographic signature of the policy 120 or the configuration 118 is inspected by the RHD 100 (e.g., the validator component 106). If the RHD 100 is preconfigured with a public key of a TTP, the accompanying signature of the policy is inspected.

In (optional) step 1004: the policy 120 is loaded by the validator component 106. In some embodiments, the validator component 106 is configured using a policy supplied by the user, e.g. in JSON or XML format. In other embodiments, the validator component 106 is provided as soft IP and may have a "build-in" policy. In such cases, this step is skipped.

In (optional) step 1006: additional bitstreams or SW are saved in a non-volatile memory of the RHD 100. If the policy 120 includes loading of alternative components, such as (partial) bitstreams and SW components, these must also be stored on the non-volatile memory of the RHD 100.

In step 1008, the configuration 118 for the RHD 100 is deployed. When the RHD 100 should move to the usage phase, the configuration 118 is deployed as the last step of the deployment phase. This step may also be separated from the rest of the deployment phase. In other words, the above optional steps 1002, 1004, and 1006 are not executed at the same time as 1008. In the deployment phase, the configuration 118 is provided to the RHD 100. The configuration 118 contains at least the policy 120 and a bitstream, and optionally software components or ASIC configurations. All components of the configuration 118 are saved in the non-volatile memory on the RHD 100.

The policy 120 may include particular measurement thresholds that are connected to particular functionality being activated or deactivated. In other words, the policy 120 may also contain measurement thresholds where the exceeding or surpassing of the threshold leads to a specific action. Examples of such measurements are a GPS position (or the European equivalent, Galileo), a signal strength from a certain base station, which Public Land Mobile Networks (PLMNs) are available in a given location or an environmental condition such as a temperature or a wind speed. The policy 120 may include rules related to measurements done by sensors or actions performed by actuators. Such actions may include the deactivation of particular regions in the PL 108 or another bitstream being loaded.

One method to achieve positioning information is to use the 5G location service, which is described in 3GPP TS 23.273 V17.1.0 (2021-6) ("5G System (5GS) Location Services (LCS); Stage 2 (Release 17)"), solely or in combination with other positioning information such as GPS coordinates. Then, the security of the 5G network may be leveraged to the positioning information used by the RHD 100, assumed that a trustworthy connection is used between the UE and the RHD 100. Using such a method, the trustworthiness of the positioning information may be increased in situations where there is a risk that positioning information (such as GPS coordinates) can be mocked or faked. The policy 120 may also define how often the measurements should be checked and what action to take if the measurements are not received during the chosen time interval. Furthermore, the policy 120 may define what data may be transmitted from the moving object in particular geographical areas.

Figure 11:
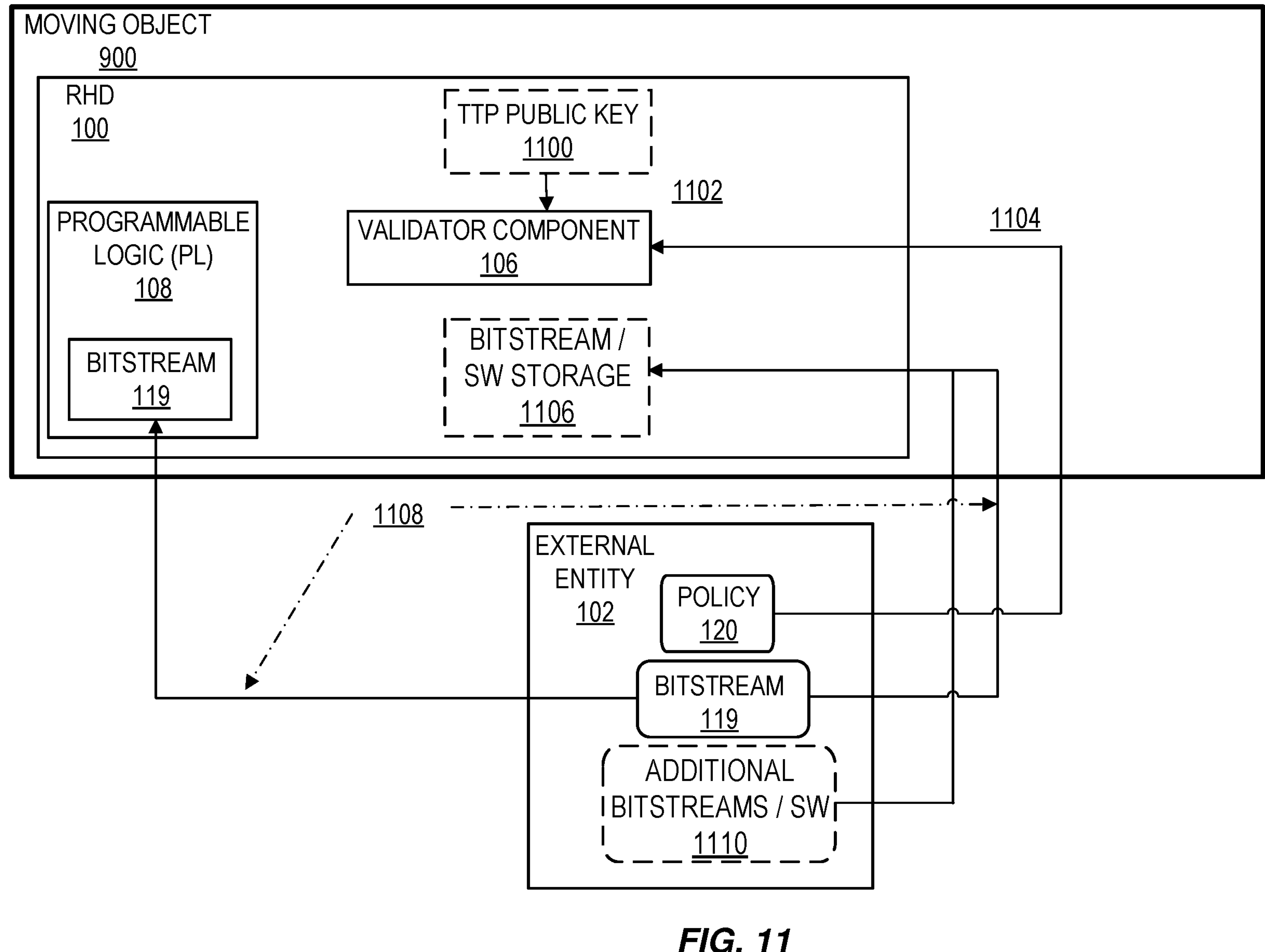
FIG. 11 illustrates an overview of components in an RHD involved in the deployment phase in accordance with some embodiments of the present disclosure.

FIG. 11 illustrates an overview of components involved in the deployment phase in accordance with some embodiments of the present disclosure. As stated above, examples of the moving object 900 are a vehicle and a drone. The components of the RHD 100 (e.g., PL 108, the validator component 106) and the external entity 102 (e.g., the policy 120) are the same as the components having the same reference numbers in FIG. 1 and disclosed in the relevant paragraphs. Optionally, the RHD 100 may store the public key 1100 provided by the TTP. Thus, the validator component 106 receives the policy 120 from the external entity 102 and check whether the policy 120 is cryptographically correct in accordance with the public key 1100.

As illustrated in FIG. 11, the external entity 102 provides the bitstream 119 to the RHD 100, and thus RHD 100 loads the bitstream 119 into the PL 108, or optionally, in a separate storage 1106 in the RHD 100 (step 1108). Optionally, the external entity 102 may also provide the additional bitstreams or software 1110 to the separate storage 1106 of the RHD 100.

Figure 12:
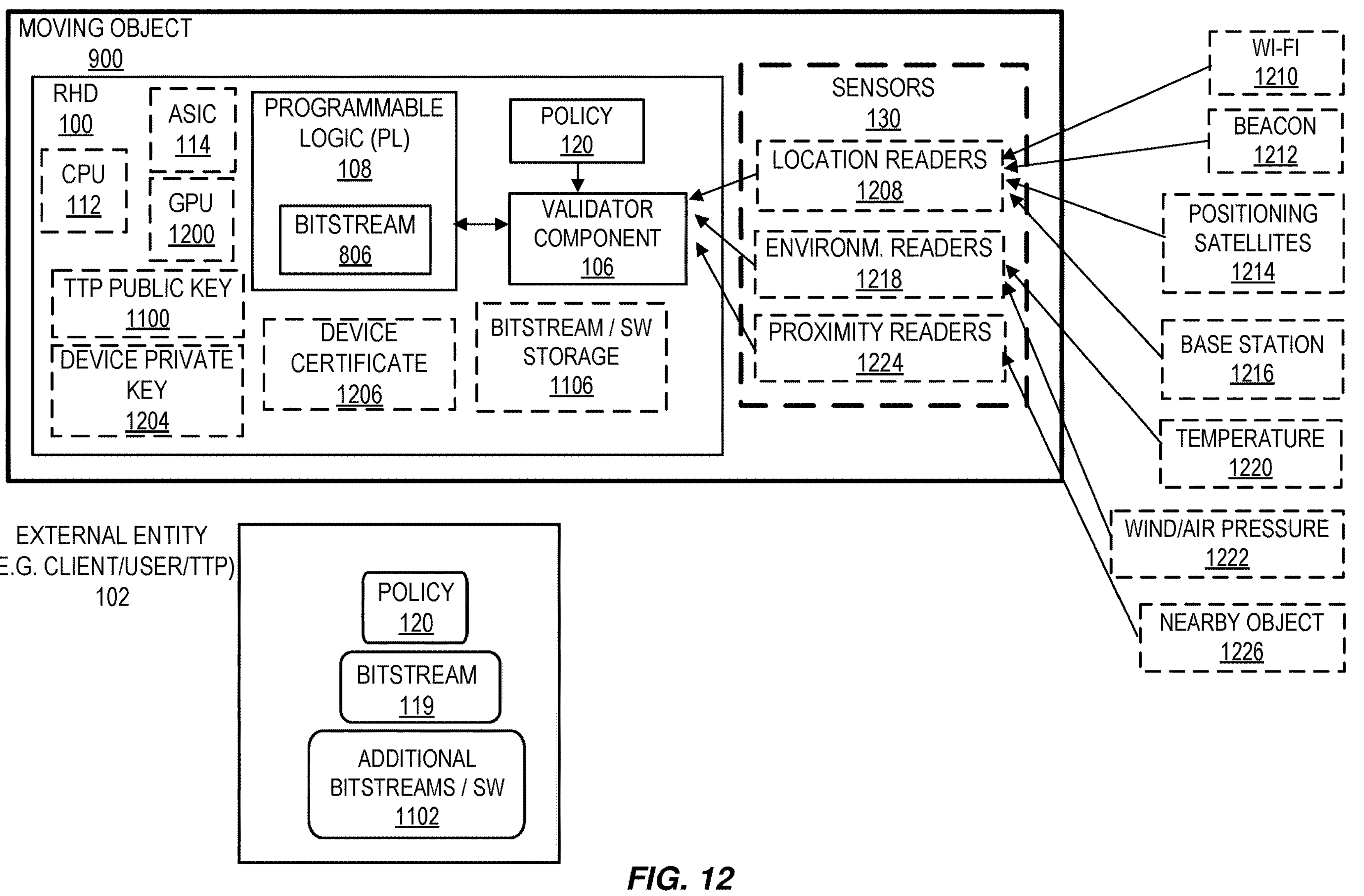
FIG. 12 illustrates an overview of components involved in the usage phase in an RHD in accordance with some embodiments of the present disclosure.

FIG. 12 illustrates an example of components involved in the usage phase in accordance with some embodiments of the present disclosure. Some of the components in FIG. 12 (e.g., the RHD 100, the PL 108, the validator component 106) are the same as the components having the same reference numbers in FIG. 1 and FIG. 11. FIG. 12 further illustrates that the RHD 100 is connected with the sensors 130 that comprises, for example, (1) location readers 1208 (connected with Wi-Fi 1210, beacons 1212, positioning satellites 1214, base stations 1216), (2) environmental readers 1218 (connected with temperature sensors 1220, wind/air pressure sensors 1222), and (3) proximity readers 1224 (nearby object detectors 1226). Those sensors 930 measure particular items, such as the location of the moving object 900, wind/air pressures, or temperatures, and provide the measurements to the validator component 106. Then, the validator component 106 evaluates the measurements based on the policy 120 as illustrated in FIG. 5 and explained below.

Figure 13:
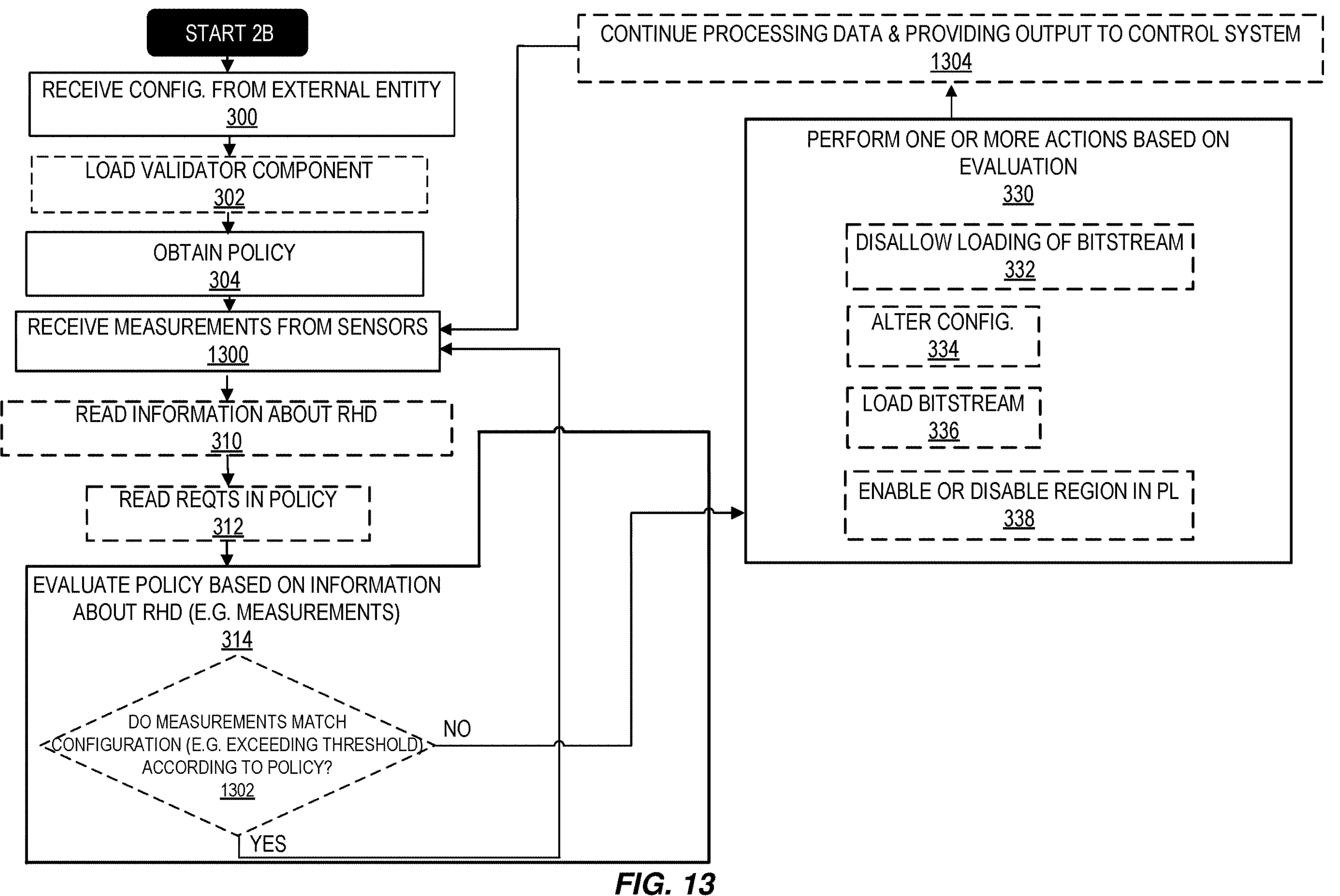
FIG. 13 is a flow chart showing the steps involved in a usage phase in an RHD in accordance with some embodiments of the present disclosure.

FIG. 13 is a flow chart showing the steps involved in the usage phase in accordance with some embodiments of the present disclosure. Some steps in FIG. 13 (for Embodiment 2) are the same as the steps having the same reference numbers in FIG. 3 (for Embodiment 1).

In step 300, the RHD 100 receives the configuration 118 that is desired by the external entity 102. In (optional) step 302, the RHD 100 (e.g., the loader component 104) loads the configuration 118 into the validator component 106.

In steps 304, the RHD 100 obtains the policy 120 (step 304). As illustrated in FIG. 3, the RHD 100 may obtain the policy by receiving the policy 120 from the external entity 102 (step 306) or by extracting the policy 120 from the configuration 118 (step 308).

In step 1300, the RHD 100 receives measurements from the sensors 130 when the sensors 130 are directly connected to the RHD 100, as illustrated in FIG. 12. Alternatively, the measurements may be collected by the external entity 102 and forwarded to the RHD 100.

In (optional) step 310, the RHD 100 reads information about the RHD 100 (e.g., the properties of the RHD 100) from the memory 110. In (optional) step 312, the RHD 100 (e.g., the validator component 106) reads requirements in the policy 120.

In step 314, the RHD 100 evaluates the policy 120 based on the measurements, e.g. received from the sensors 130 or the external entity 102. If the measurements match the configuration 118 according to the policy 120 (1302, YES), the RHD 100 receives another set of measurements (step 1300). If the measurements do not match the configuration 118 according to the policy 120 (1302, NO), the RHD 100 performs one or more actions based on the evaluation (step 300). For example, the one or more actions comprise (i) disallowing loading of at least one bitstream 119 comprised in the configuration 118 into at least one region of PL 108 (step 332); (ii) altering the configuration 118 by loading an altered version of the bitstream 119 into at least one region of PL 108 (step 334); (iii) loading at least one (partial) bitstream 119 comprised in the configuration 118 into at least one region of PL 108 (step 336); (iv) enabling or disabling at least one region of PL 108 (step 338); or (v) any combination of (i)-(iv). After the one or more actions are performed, the RHD 100 continues processing data and provides an output to the control system 902 (step 1304).

II.C.2. Alternative Embodiments of Embodiment 2

II.C.2.a. Deactivating Region Based on Measurement

Figure 14:
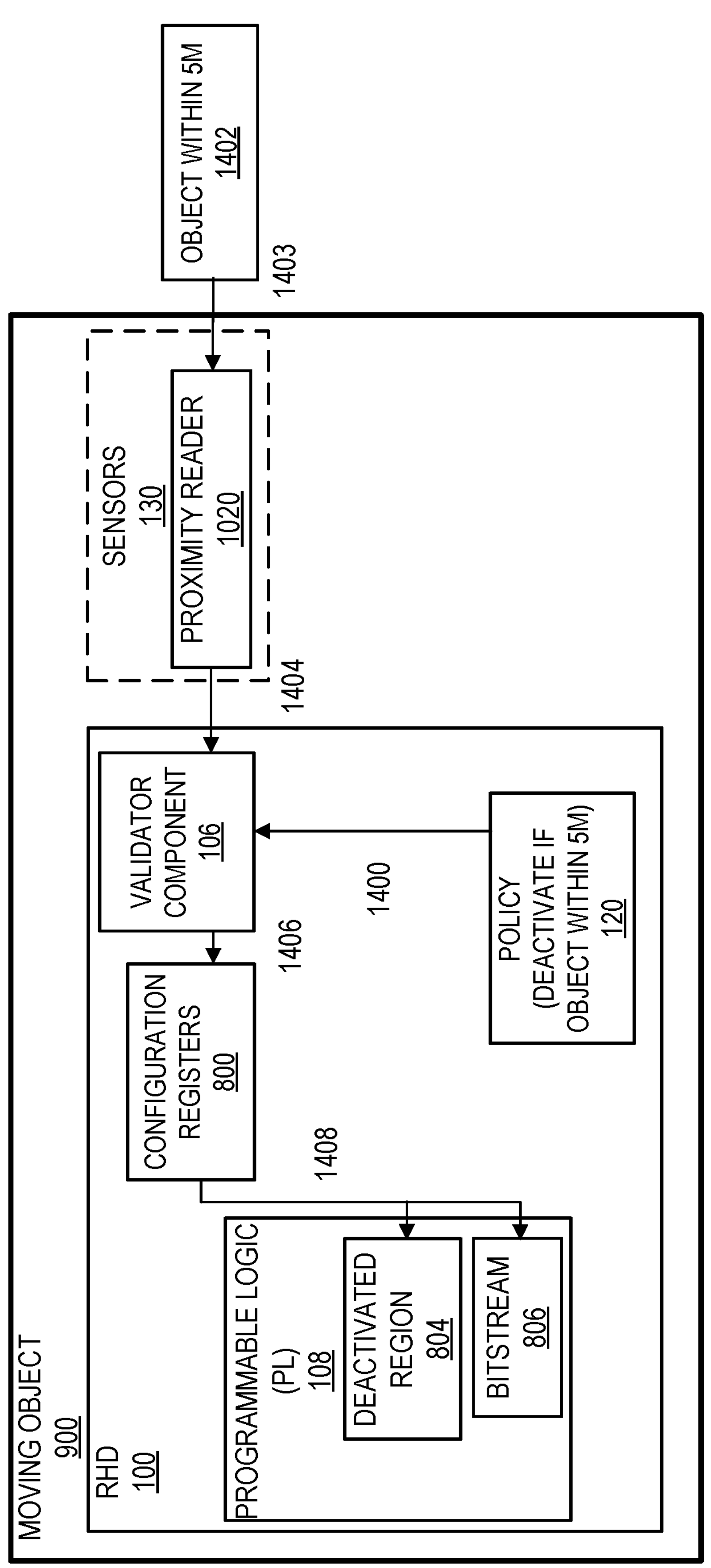
FIG. 14 illustrates an embodiment of an RHD where regions are deactivated by the validator component in order to comply with the policy.

FIG. 14 illustrates an example implementation of the actions performed by the RHD 100 when the measurements do not match the configuration 118 according to the policy 120 (1302, NO), in particular the step 338 ("(iv) enabling or disabling at least one region of PL 108"). The components of the RHD 100 (e.g., PL 108, the validator component 106) are the same as the components having the same reference numbers in FIG. 1 and FIG. 11 and disclosed in the relevant paragraphs. In this embodiment, regions 804 within the PL 108 are deactivated by the validator component 106 in order to comply with the policy 120. The validator component 106 loads the policy 120 that includes an instruction to deactivate the region 804 if a nearby object is within 5 meters (step 1400). The sensors 130 (in particular, the proximity readers 1224) detect that an object 1402 is within 5 meters from the moving object 900 (step 1403) and forward the detection to the validator component 106 (step 1404). Then, the validator component 106 uses the configuration registers 800 (step 1406) and instructs the PL 108 to deactivate the region 804 of the PL 108 (step 1408).

II.C.2.b. Storing Partial Bitstream Based on Measurement

Figure 15:
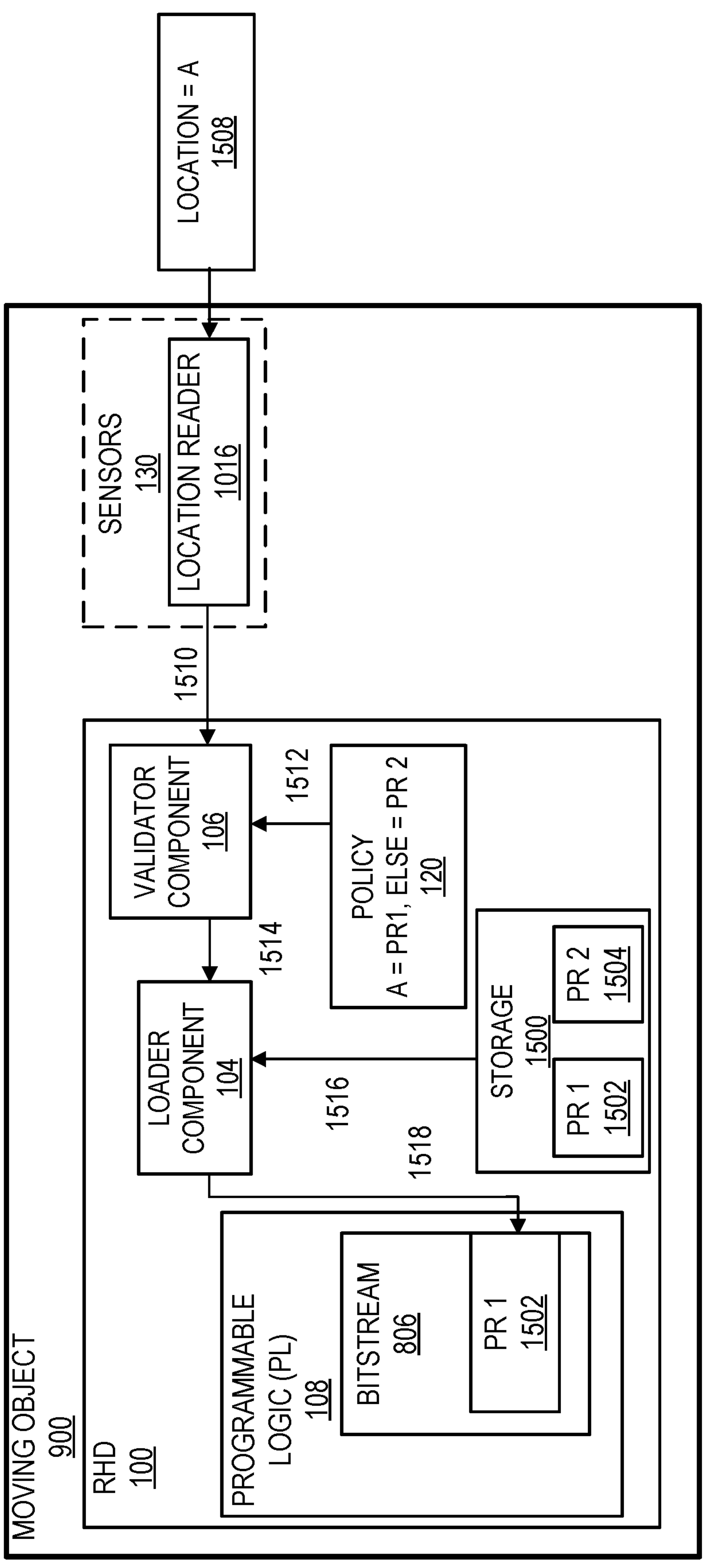
FIG. 15 illustrates an embodiment of an RHD where stored partial bitstreams are used by the validator component to change the Programmable Logic (PL) configuration of the RHD and comply with the policy.

FIG. 15 illustrates an embodiment where a storage 1500 of the RHD 100 contains partial bitstreams (e.g., PR1 1502) that are used by the validator component 106 to change the PL configuration of the RHD and to comply with the policy 120. The components of the RHD 100 (e.g., PL 108, the validator component 106) are the same as the components having the same reference numbers in FIG. 1 and FIG. 11 and disclosed in the relevant paragraphs. The sensors 130 (in particular, the location readers 1208) detect that the location 1508 of the moving object 900 is "A" and provide the detection result to the validator component 106 (step 710). The validator component 106 loads the policy 120 that states that the PR 1 1502 is used when the location 1508 of the moving object 900 is "A" (step 1512) and PR 2 1504 is used otherwise. Based on the evaluation of the measured location 1508 in accordance with the policy 120, the validator component 106 instructs the loader component 106 to load the bitstream "PR1" from the storage 1500 (step 1516). After loading PR 1 1502 from the storage 1500, the loader component 104 loads PR 1 1502 into the PL 108.

II.C.2.c. Validator Component Within PL

Figure 16:
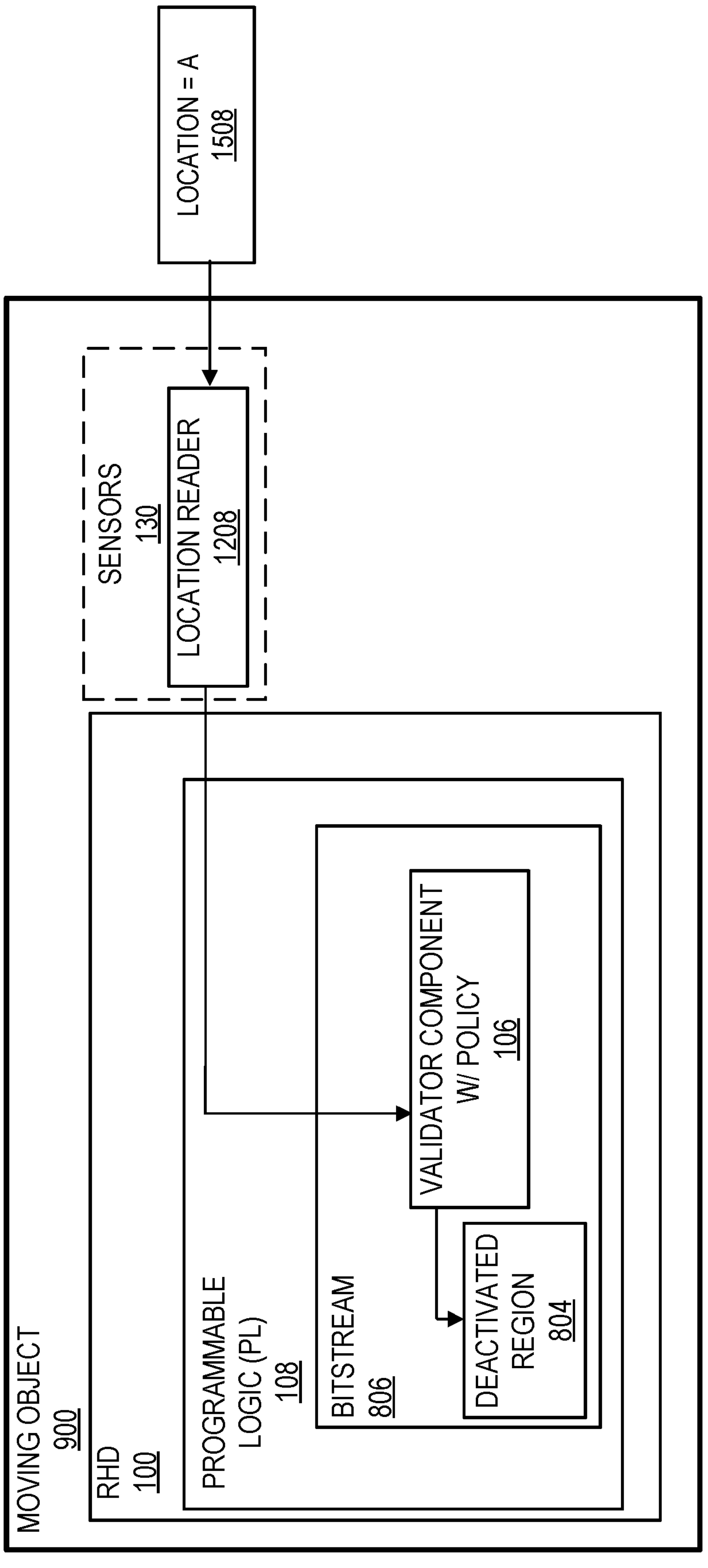
FIG. 16 illustrates an embodiment where the validator component is implemented as a part of the PL.

FIG. 16 illustrates an embodiment where the validator component 106 is implemented as a part of the PL 108. The components of the RHD 100 (e.g., PL 108, the validator component 106) are the same as the components having the same reference numbers in FIG. 1 and FIG. 11 and disclosed in the relevant paragraphs. The validator component 106 is implemented within the PL 108, e.g. running on a soft CPU, and is preconfigured with a policy. In this embodiment, the validator component 106 activates or deactivates regions 804 to comply with the policy. In other words, the configuration 118 of the policy 120 and bitstreams may be done by the user of the moving object 900, but it may also be done by the chip manufacturer or the manufacturer of the moving object 900. In this embodiment, the RHD 100 is preconfigured and not changeable by the user.

II.C.2.d. Trusted Policy (Attestation of Policy or RHD Configuration)

In one embodiment, an inspection service, e.g. a public authority or the law enforcement, may request proof of what policy is applied within the moving object 900 to ensure that within the moving object 900 is compliant with regulations. The inspection service must additionally trust that the validator component 106 is legitimate and functioning properly. This requires a trust mechanism where the inspection service can attest the validator component 106. To meet the request, the present disclosure proposes an attestation phase having the trust mechanism. For example, the trust mechanism may include a hard validator component having access to a key that is either owned or signed by the TTP. Alternatively, the trust mechanism may include that a bitstream of a soft validator component is a part of a cryptographically signed hash-chain of boot components. It is assumed that these keys have been provided by a TTP prior to the deployment phase. For example, the TTP may be embodied by the manufacturer of the RHD 100 or the manufacturer of the moving object 900.

Figure 17:
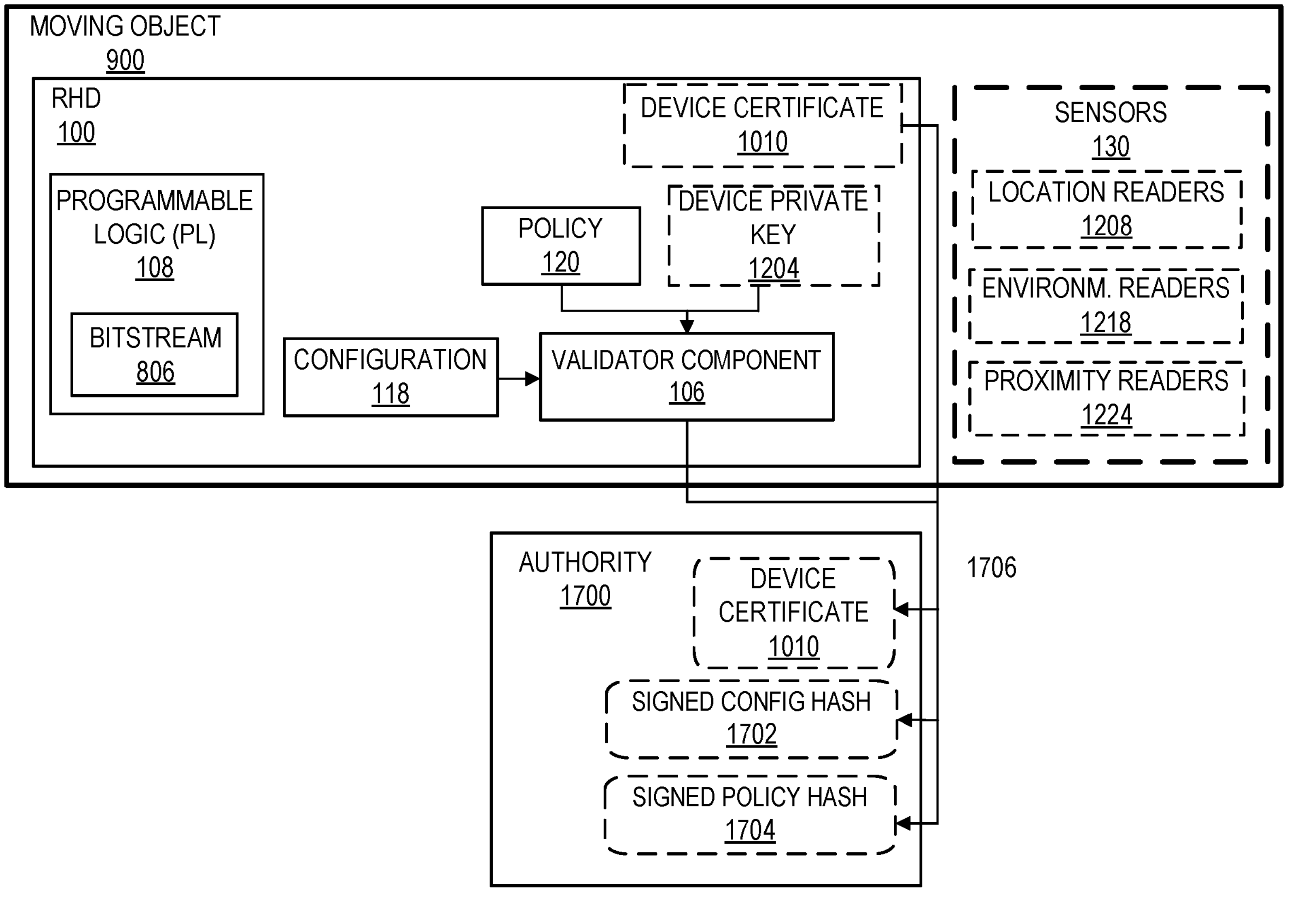
FIG. 17 illustrates an overview of components of an RHD, which are involved in an attestation phase in accordance with some embodiments of the present disclosure.

If the inspection service decides to trust the (hard or soft) validator component, the validator component may be asked to provide (a) a signed hash of the current policy or any bitstreams running in the PL or (b) software components in CPUS. Optionally or additionally, the inspection service may receive (a) state of hardware components, (b) current measurements being fed from the sensors, and (c) possibly configuration from other components, such as specialized accelerators present on the RHD 100. FIG. 17 illustrates an overview of components involved in the attestation phase in accordance with some embodiments of the present disclosure. The components of the RHD 100 (e.g., PL 108, the validator component 106) are the same as the components having the same reference numbers in FIG. 1 and FIG. 11 and disclosed in the relevant paragraphs. For example, as requested by the authority 1700, the RHD 100 provides the device certificate 1010, a signed hash of the configuration 108, and a signed hash of the policy 120 to the authority 1700, which, in turn, save them as the device certificate 1702, a signed configuration hash 1702, or a signed policy hash 1704 (step 1706), respectively.

II.C.2.e. Trusted Policy (Policy Signature)

In one embodiment, the policy is not supplied by the user but rather by the manufacturer of either the portable entity or the RHD 100. In this case, the policy 120 may be signed by a private key belonging to either of these parties. In such an embodiment, the policy 120 may need a trusted signature to be accepted by the RHD. The signature can, for example, be made by a private key corresponding to a public key stored in the RHD 100. When the policy 120 is loaded, the signature is inspected before accepting the policy 120.

II.C.2.f. Policy and Bitstream Updates

In one embodiment, the policy 120 may, in addition to being deployed in the deployment phase, be updated remotely in the usage phase. This may e.g., be beneficial to update zones where the camera is not allowed to be activated. The updated policy may require a signature corresponding to a public key present on the RHD 100. Additionally or alternatively, bitstreams stored on the RHD 100 may also be replaced in the usage phase.

II.C.2.g. Validator Component Communicating with Actuator

In one embodiment, the validator component 106 may communicate directly with external actuators. When the validator component 106 detects that a certain policy rule requires an action, it may send a signal to an external component without reconfiguring the RHD 100.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GS Fifth Generation System
ACAP Adaptable Computing Acceleration Platform
AES Advanced Encryption standard
AI Artificial Intelligence
ASIC Application-Specific Integrated Circuit
BBRAM Battery Backed Random Access Memory
CaaS Container-as-a-Service
CLB Configurable Logic Block
COTS Commercial Off The Shelf
CPU Central Processing Unit
CSP Cloud Service Provider
DRM Digital Right Management
DUK Device-unique Key
ETSI European Telecommunications Standards Institute
EU European Union
E-UTRA Evolved Universal Terrestrial Radio Access
FaaS FPGA-as-a-service
FPGA Field Programmable Gate Array
GDPR General Data Protection Regulation
GPS Global Positioning System
GPU Graphics Processing Unit
HP Hard Processors
HwO Hardware Owner
IaaS Infrastructure-as-a-Service
IP Intellectual Property
JSON JavaScript Object Notation
JTAG Joint Test Action Group
LiDAR Light Detection And Ranging
MCC Mobile Country Code
ME Mobile Equipment
MIB Master Information Block
MNC Mobile Network Code
MNO Mobile Network Operator
MTP Multiple-Time Programmable (memory)
NFV Network Functions Virtualisation
NR New Radio
NVM Non-Volatile Memory
OTP One-Time Programmable (memory)
PCF Policy Control Function
PDI Process Data Interface
PL Programmable Logic
PLMN Public Land Mobile Network PR Partial Reconfiguration
PS Processing Subsystem
RaDAR Radio Detection And Ranging
RAN Radio Access Network
RHD Reconfigurable Hardware Device
RPA Remotely Piloted Aircraft
SGX Software Guard extensions
SIB1 SystemInformationBlockType1
SLA Service Level Agreement
SoC System-on-Chip
SPI Serial Peripheral Interface
SW Software
TPAE Third Party Authorized Entity
TPM Trusted Platform Module
TTP Trusted Third Party
UAS Unmanned Aerial Systems
UAV Unmanned Aerial Vehicle
UAVC Unmanned Aerial Vehicle Controller
UE User Equipment
UGV Unmanned Ground Vehicle
UICC Universal Integrated Circuit Card
UTM UAS Traffic Management
UUV Unmanned Underwater Vehicle
V2X Vehicle-to-everything
VM Virtual Machine
XML eXtensible Markup Language Those skilled in the art will recognize improvements and modifications to the embodiments of the present disclosure. All such improvements and modifications are considered within the scope of the concepts disclosed herein.

The invention claimed is:

1. A Reconfigurable Hardware Device, RHD, comprising:
at least one region of programmable logic;
a loader component configured to receive a configuration to be loaded onto the RHD, wherein at least one bitstream for the at least one region of programmable logic is comprised in the configuration, wherein the configuration further includes a policy that specifies requirements on properties of the RHD that must be satisfied in order for the configuration as received to be loaded onto the RHD; and
a validator component configured to:
obtain the policy;
perform an evaluation of the policy based on the properties of the RHD, to check whether the RHD satisfies the requirements specified by the policy; and
perform one or more actions based on a result of the evaluation of the policy.

2. The RHD of claim 1, wherein the validator component is further configured to obtain the policy from the loader component.

3. The RHD of claim 1, wherein, responsive to the result of the evaluation of the policy indicating that the evaluation is successful in confirming that the RHD satisfies the requirements specified by the policy, the one or more actions performed by the validator component comprise allowing at least one bitstream comprised in the configuration to be loaded into the at least one region of programmable logic.

4. The RHD of claim 3, wherein, responsive to the result of the evaluation of the policy indicating that the evaluation is successful in confirming that the RHD satisfies the requirements specified by the policy, the one or more actions performed by the validator component further comprise sending a proof-of-compliance to an external entity that provided the policy, wherein the proof-of-compliance is asserted as proof that the RHD satisfies the requirements specified by the policy.

5. The RHD of claim 1, wherein, responsive to the result of the evaluation of the policy indicating that the evaluation is unsuccessful in confirming that the RHD satisfies the requirements specified by the policy, the one or more actions performed by the validator component comprise:
(i) disallowing loading of at least one bitstream comprised in the configuration into at least one region of programmable logic;
(ii) altering the configuration by loading an altered version of the bitstream into at least one region of programmable logic;
(iii) disabling at least one region of programmable logic; or
(iv) any combination of (i-iii).

6. The RHD of claim 1, wherein:
in order to perform the evaluation of the policy, the validator component is further configured to determine whether a set of the properties of the RHD is cryptographically signed with a private key that is aligned with a public key in the RHD; and
the result of the evaluation of the policy is successful if the set of the properties of the RHD is cryptographically signed with the private key that is aligned with the public key in the RHD and the set of the properties of the RHD satisfies the one or more requirements defined by the policy and otherwise the result of the evaluation of the policy is unsuccessful.

7. The RHD of claim 1, wherein:
the loader component is further configured to receive an initial policy before receiving the configuration; and
the validator component is further configured to:
determine whether the properties of the RHD satisfy a requirement defined by the initial policy;
responsive to determining that the properties of the RHD satisfy the requirement defined by the initial policy, send an indication that the initial policy is satisfied to an external entity that provided the initial policy.

8. The RHD of claim 1, wherein the validator component is further configured to:
receive a set of measurements from a set of sensors associated to the RHD, the set of measurements being indicative of one or more of the properties of the RHD; and
perform the evaluation of the policy based on the set of measurements.

9. The RHD of claim 8 wherein, responsive to the evaluation result indicating that the evaluation is not successful in confirming that the RHD satisfies the requirements specified by the policy, the one or more actions performed by the validator component comprises:
(i) disallowing loading of at least one bitstream comprised in the configuration into at least one region of programmable logic;
(ii) altering the configuration by loading an altered version of the bitstream into at least one region of programmable logic;
(iii) disabling at least one region of programmable logic; or
(iv) any combination of (i)-(iii).

10. A method performed by a Reconfigurable Hardware Device, RHD, that comprises at least one region of programmable logic the method comprising:
receiving a configuration to be loaded onto the RHD, wherein at least one bitstream for the at least one region of programmable logic is comprised in the configuration, wherein the configuration further includes a policy that specifies requirements on properties of the RHD that must be satisfied in order for the configuration as received to be loaded onto the RHD;

obtaining the policy from the configuration;

performing an evaluation of the policy based on the properties of the RHD, to check whether the RHD satisfies the requirements specified by the policy; and performing one or more actions based on a result of the evaluation of the policy.

11. The method of claim 10 wherein obtaining the policy comprises obtaining the policy from a loader component configured to receive the configuration.

12. The method of claim 10, wherein, responsive to the result of the evaluation of the policy indicating that the evaluation is successful in confirming that the RHD satisfies the requirements specified by the policy, the one or more actions comprise allowing at least one bitstream comprised in the configuration to be loaded into at least one region of programmable logic.

13. The RHD of claim 1, wherein the loader component is configured to receive the configuration from an external entity that defines the policy, owns the configuration, and uses the RHD.

14. The RHD of claim 13, wherein the external entity uses the RHD as part of an Infrastructure-as-a-Service (IaaS) offering.

15. The RHD of claim 1, wherein the policy is specific to a user of the RHD, a bitstream, an Intellectual Property (IP) vendor, or an IP block, and is not specific to the RHD.

16. The RHD of claim 1, wherein the requirements specified by the policy include one or more of:

a requirement on a geolocation of the RHD;

a requirement on available hardware capabilities of the RHD;

a requirement on physical protection of the RHD; or a requirement on an organization that owns, controls, or is authorized to manage the RHD.

17. The RHD of claim 1, wherein the policy specifies requirements on properties of the RHD that include a property defining a security class which is settable individually per virtual instance accessing the RHD or which is settable individually per device.

18. The method of claim 10, wherein said receiving comprises receiving the configuration from an external entity that defines the policy, owns the configuration, and uses the RHD.

19. The method of claim 18, wherein the external entity uses the RHD as part of an Infrastructure-as-a-Service (IaaS) offering.

20. The method of claim 10, wherein the policy is specific to a user of the RHD, a bitstream, an Intellectual Property (IP) vendor, or an IP block, and is not specific to the RHD.

* * * * *